United States Patent
Sato

(10) Patent No.: US 8,423,822 B2
(45) Date of Patent: Apr. 16, 2013

(54) STORAGE SYSTEM AND METHOD OF CONTROLLING THE SAME

(75) Inventor: Takahito Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 68 days.

(21) Appl. No.: 13/122,927

(22) PCT Filed: Mar. 23, 2011

(86) PCT No.: PCT/JP2011/001683
§ 371 (c)(1),
(2), (4) Date: Apr. 6, 2011

(87) PCT Pub. No.: WO2012/127528
PCT Pub. Date: Sep. 27, 2012

(65) Prior Publication Data
US 2012/0246511 A1 Sep. 27, 2012

(51) Int. Cl.
*G06F 11/00* (2006.01)
(52) U.S. Cl.
USPC ........... 714/6.3; 714/4.11; 714/6.2; 714/6.21; 714/6.22; 714/6.23; 714/6.32
(58) Field of Classification Search ................. 714/4.11, 714/6.2, 6.21, 6.22, 6.23, 6.3, 6.32
See application file for complete search history.

(56) References Cited

U.S. PATENT DOCUMENTS

| | | | |
|---|---|---|---|
| 7,269,611 B2 * | 9/2007 | Miki ............................. | 707/610 |
| 7,370,228 B2 * | 5/2008 | Takahashi et al. ........... | 714/6.21 |
| 7,594,072 B2 * | 9/2009 | Osaki et al. .................. | 711/113 |
| 8,185,663 B2 * | 5/2012 | Cochran et al. ............... | 709/250 |
| 2003/0084367 A1 * | 5/2003 | Suemura ......................... | 714/4 |
| 2003/0204773 A1 | 10/2003 | Petersen et al. | |
| 2007/0100909 A1 | 5/2007 | Padovano et al. | |
| 2008/0072000 A1 * | 3/2008 | Osaki et al. .................... | 711/162 |
| 2008/0104443 A1 * | 5/2008 | Akutsu et al. .................. | 714/6 |
| 2009/0094403 A1 * | 4/2009 | Nakagawa et al. ............. | 711/6 |
| 2009/0271582 A1 | 10/2009 | Ninose | |
| 2011/0066801 A1 | 3/2011 | Sato | |
| 2011/0154102 A1 * | 6/2011 | Akutsu et al. ................. | 714/6.1 |
| 2011/0302447 A1 * | 12/2011 | Watanabe et al. ............ | 714/6.22 |

OTHER PUBLICATIONS

PCT International Search Report and Written Opinion on application No. PCT/JP2011/001683 dated Dec. 21, 2011.; 12 pages.

\* cited by examiner

*Primary Examiner* — Joshua P. Lottich
(74) *Attorney, Agent, or Firm* — Foley & Lardner LLP

(57) ABSTRACT

A storage system, method and program product, the system comprising: storage devices; and a controller configured to: provide virtual volumes to a host computer; manage logical units on the storage device and storage pools; allocate, in response to receiving a write request to a virtual volume, a storage region of the storage pools; and store data related to the write request in the storage region allocated, wherein the controller is further configured to: allocate first storage region in first storage pool to first virtual volume based on first size of the first storage region or the first virtual volume; allocate a second storage region in a second storage pool to a second virtual volume of the plurality of virtual volumes based on a second size of the second storage region or the second virtual volume.

14 Claims, 23 Drawing Sheets

Fig. 3

PATH MANAGEMENT TABLE 300

| PATH ID | PATH TYPE | LUN | LDEV NUMBER | SERIAL NUMBER | PORT ID | PATH STATE | CURRENTLY-USED FLAG |
|---|---|---|---|---|---|---|---|
| 1 | OWNER | 0 | 10:00 | FFF0 | 1A | ONLINE | 1 |
| 2 | OWNER | 1 | 10:01 | FFF0 | 1A | ONLINE | 1 |
| 3 | OWNER | 0 | 10:00 | FFF0 | 1X | OFFLINE | 0 |
| 4 | OWNER | 1 | 10:01 | FFF0 | 1X | OFFLINE | 0 |
| 5 | NON-OWNER | 0 | 10:00 | FFF0 | 2A | ONLINE | 0 |
| 6 | NON-OWNER | 1 | 10:01 | FFF0 | 2A | ONLINE | 0 |
| 7 | NON-OWNER | 0 | 10:00 | FFF0 | 2X | OFFLINE | 0 |
| 8 | NON-OWNER | 1 | 10:01 | FFF0 | 2X | OFFLINE | 0 |

Fig. 4

OWN VIRTUAL PORT MANAGEMENT TABLE 410

| OWN REAL PORT ID (411) | OWN VIRTUAL PORT ID (412) | ENABLED /DISABLED (413) |
|---|---|---|
| 1A | 1A | ENABLED |
| 1A | 1X | DISABLED |

LU MANAGEMENT TABLE 430

| LUN (431) | OWN REAL LDEV NUMBER (432) |
|---|---|
| 1 | 10:00 |
| 2 | 10:01 |
| : | : |

PARTNER VIRTUAL PORT MANAGEMENT TABLE 420

| PARTNER REAL SERIAL NUMBER (421) | PARTNER REAL PORT ID (422) | PARTNER VIRTUAL PORT ID (423) | ENABLED /DISABLED (424) |
|---|---|---|---|
| 2222 | 2A | 2A | ENABLED |
| 2222 | 2A | 2X | DISABLED |

REMOTE PAIR MANAGEMENT TABLE 440

| OWN REAL LDEV NUMBER (441) | PVOL /SVOL (442) | PARTNER REAL SERIAL NUMBER (443) | PARTNER REAL LDEV NUMBER (444) | PARTNER REAL PORT ID (445) | CONTROL STATE (446) | QUORUM DRIVE ID (447) |
|---|---|---|---|---|---|---|
| 10:00 | PVOL | 2222 | 21:00 | 2A | PAIR | F |
| 10:01 | PVOL | 2222 | 21:01 | 2A | PAIR | F |
| : | : | : | : | : | : | : |

QUORUM DRIVE MANAGEMENT TABLE 450

| QUORUM DRIVE ID (451) | PARTNER REAL SERIAL NUMBER (452) | OWN VIRTUAL SERIAL NUMBER (453) | REAL LDEV NUMBER (454) |
|---|---|---|---|
| F | 2222 | FFF0 | 80:00 |
| : | : | : | : |

SERIAL NUMBER MANAGEMENT TABLE 460

| OWN REAL SERIAL NUMBER (461) | OWN VIRTUAL SERIAL NUMBER (462) |
|---|---|
| 1111 | FFF0 |
| 1111 | FFF1 |
| 1111 | FFF2 |

UNIQUE INFORMATION CONVERSION TABLE 470

| REAL UNIQUE INFORMATION | | | VIRTUAL UNIQUE INFORMATION | | |
|---|---|---|---|---|---|
| OWN REAL PORT ID (471) | OWN REAL LDEV NUMBER (472) | OWN REAL SERIAL NUMBER (473) | OWN VIRTUAL PORT ID (474) | OWN VIRTUAL LDEV NUMBER (475) | OWN VIRTUAL SERIAL NUMBER (476) |
| 1A | 10:00 | 1111 | 1A | 10:00 | FFF0 |
| 1A | 10:01 | 1111 | 1A | 10:01 | FFF0 |
| 1A | 10:00 | 1111 | 1X | 10:00 | FFF0 |
| 1A | 10:01 | 1111 | 1X | 10:01 | FFF0 |

Fig. 5

OWN VIRTUAL PORT MANAGEMENT TABLE 510

| OWN REAL PORT ID (511) | OWN VIRTUAL PORT ID (512) | ENABLED /DISABLED (513) |
|---|---|---|
| 2A | 2A | ENABLED |
| 2A | 2X | DISABLED |

LU MANAGEMENT TABLE 530

| LUN (531) | OWN REAL LDEV NUMBER (532) |
|---|---|
| 1 | 21:00 |
| 2 | 21:01 |
| : | : |

PARTNER VIRTUAL PORT MANAGEMENT TABLE 520

| PARTNER REAL SERIAL NUMBER (521) | PARTNER REAL PORT ID (522) | PARTNER VIRTUAL PORT ID (523) | ENABLED /DISABLED (524) |
|---|---|---|---|
| 1111 | 1A | 1A | ENABLED |
| 1111 | 1A | 1X | DISABLED |

REMOTE PAIR MANAGEMENT TABLE 540

| OWN REAL LDEV NUMBER (541) | PVOL /SVOL (542) | PARTNER REAL SERIAL NUMBER (543) | PARTNER REAL LDEV NUMBER (544) | PARTNER REAL PORT ID (545) | CONTROL STATE (546) | QUORUM DRIVE ID (547) |
|---|---|---|---|---|---|---|
| 21:00 | SVOL | 1111 | 10:00 | 1A | PAIR | F |
| 21:01 | SVOL | 1111 | 10:01 | 1A | PAIR | F |
| : | : | : | : | : | : | : |

QUORUM DRIVE MANAGEMENT TABLE 550

| QUORUM DRIVE ID (551) | PARTNER REAL SERIAL NUMBER (552) | OWN VIRTUAL SERIAL NUMBER (553) | REAL LDEV NUMBER (554) |
|---|---|---|---|
| F | 1111 | FFF0 | 90:00 |
| : | : | : | : |

SERIAL NUMBER MANAGEMENT TABLE 560

| OWN REAL SERIAL NUMBER (561) | OWN VIRTUAL SERIAL NUMBER (562) |
|---|---|
| 2222 | FFF0 |
| 2222 | FFF1 |
| 2222 | FFF2 |

UNIQUE INFORMATION CONVERSION TABLE 570

| REAL UNIQUE INFORMATION | | | VIRTUAL UNIQUE INFORMATION | | |
|---|---|---|---|---|---|
| OWN REAL PORT ID (571) | OWN REAL LDEV NUMBER (572) | OWN REAL SERIAL NUMBER (573) | OWN VIRTUAL PORT ID (574) | OWN VIRTUAL LDEV NUMBER (575) | OWN VIRTUAL SERIAL NUMBER (576) |
| 2A | 21:00 | 2222 | 2A | 10:00 | FFF0 |
| 2A | 21:01 | 2222 | 2A | 10:01 | FFF0 |
| 2A | 21:00 | 2222 | 2X | 10:00 | FFF0 |
| 2A | 21:01 | 2222 | 2X | 10:01 | FFF0 |

Fig. 6

| STAGE | STATE | DETAILS |
|---|---|---|
| FIRST STAGE | NORMAL OPERATION STATE | HOST COMPUTER SENDS DATA INPUT/OUTPUT REQUEST ONLY TO FIRST STORAGE APPARATUS. |
| | | PATH FROM HOST COMPUTER TO SECOND STORAGE APPARATUS IS ONLINE. LU IN FIRST STORAGE APPARATUS AND LU IN SECOND STORAGE APPARATUS FORM REMOTE PAIR. |
| | | FIRST STORAGE APPARATUS SHOWS VIRTUAL UNIQUE INFORMATION TO HOST COMPUTER. |
| | | ONE STORAGE APPARATUS, LUS (LDEVS) IN STORAGE APPARATUS, AND PLURALITY OF PATHS TO LUS WHICH ARE SPECIFIED BY VIRTUAL UNIQUE INFORMATION CAN BE SEEN BY HOST COMPUTER. |
| SECOND STAGE | OCCURRENCE OF ERROR (FAILOVER) | PATH TO FIRST STORAGE APPARATUS IS OFFLINE DUE TO ERROR. |
| | | PATH IS SWITCHED TO PATH TO SECOND STORAGE APPARATUS. |
| | | HOST COMPUTER STARTS TO SEND DATA INPUT/OUTPUT REQUEST TO SECOND STORAGE APPARATUS. |
| | | SECOND STORAGE APPARATUS SHOWS SAME VIRTUAL UNIQUE INFORMATION AS BEFORE TO HOST COMPUTER. |
| | | NO REDUNDANT MANAGEMENT USING REMOTE PAIR IS PERFORMED. |
| | | HOST COMPUTER DOES NOT NEED TO SET UNIQUE INFORMATION. |
| THIRD STAGE | PREPARATION OF NEW PRIMARY LU | SECOND STORAGE APPARATUS FORMS LOCAL PAIR OF CURRENTLY-USED SECONDARY LU (OLD SECONDARY LU) AS SOURCE AND NEW PRIMARY LU AS TARGET, AND STARTS DUPLICATION OF DATA FROM OLD SECONDARY LU TO NEW PRIMARY LU. |
| FOURTH STAGE | FORMATION OF NEW REMOTE PAIR | NEW PRIMARY LU IN SECOND STORAGE APPARATUS AND NEW SECONDARY LU IN THIRD STORAGE APPARATUS FORM REMOTE PAIR, AND START DUPLICATION OF DATA FROM NEW PRIMARY LU IN SECOND STORAGE APPARATUS TO NEW SECONDARY LU IN THIRD STORAGE APPARATUS. |
| FIFTH STAGE | START OPERATION OF UNIQUE INFORMATION VIRTUALIZATION FUNCTION USING NEW REMOTE PAIR | DUPLICATION OF DATA FROM OLD SECONDARY LU TO NEW PRIMARY LU IS COMPLETED (SAME DATA ARE STORED). |
| | | USE OF PATH FROM HOST COMPUTER TO THIRD STORAGE APPARATUS IS STARTED. |
| | | ACCEPTANCE OF DATA I/O REQUEST TO OLD SECONDARY LU IS STOPPED UPON UPDATE OF NEW PRIMARY LU. |

Fig. 8

PATH MANAGEMENT TABLE 300

| PATH ID | PATH TYPE | LUN | LDEV NUMBER | SERIAL NUMBER | PORT ID | PATH STATE | CURRENTLY -USED FLAG |
|---|---|---|---|---|---|---|---|
| 1 | OWNER | 0 | 10:00 | FFF0 | 1A | OFFLINE | 0 |
| 2 | OWNER | 1 | 10:01 | FFF0 | 1A | OFFLINE | 0 |
| 3 | OWNER | 0 | 10:00 | FFF0 | 1X | OFFLINE | 0 |
| 4 | OWNER | 1 | 10:01 | FFF0 | 1X | OFFLINE | 0 |
| 5 | NON-OWNER | 0 | 10:00 | FFF0 | 2A | ONLINE | 1 |
| 6 | NON-OWNER | 1 | 10:01 | FFF0 | 2A | ONLINE | 1 |
| 7 | NON-OWNER | 0 | 10:00 | FFF0 | 2X | OFFLINE | 0 |
| 8 | NON-OWNER | 1 | 10:01 | FFF0 | 2X | OFFLINE | 0 |

[Fig. 9]

REMOTE PAIR MANAGEMENT TABLE 540

| OWN REAL LDEV NUMBER | PVOL /SVOL | PARTNER REAL SERIAL NUMBER | PARTNER REAL LDEV NUMBER | PARTNER REAL PORT ID | CONTROL STATE | QUORUM DRIVE ID |
|---|---|---|---|---|---|---|
| 21:00 | SVOL | 1111 | 10:00 | 1A | SPLIT (SSWS) | F |
| 21:01 | SVOL | 1111 | 10:01 | 1A | SPLIT (SSWS) | F |
| : | : | : | : | : | : | : |

LOCAL COPY START PROCESSING S1200

LOCAL PAIR MANAGEMENT TABLE 1300

| OWN REAL LDEV NUMBER (1311) | SOURCE /TARGET (1312) | PARTNER REAL LDEV NUMBER (1313) | CONTROL STATE (1314) |
|---|---|---|---|
| 21:00 | SOURCE | 22:00 | PAIR |
| 21:01 | SOURCE | 22:01 | PAIR |
| : | : | : | : |
| 22:00 | TARGET | 21:00 | PAIR |
| 22:01 | TARGET | 21:01 | PAIR |
| : | : | : | : |

Fig. 15

QUORUM DRIVE MANAGEMENT TABLE 550

| 551 | 552 | 553 | 554 |
|---|---|---|---|
| QUORUM DRIVE ID | PARTNER REAL SERIAL NUMBER | OWN VIRTUAL SERIAL NUMBER | REAL LDEV NUMBER |
| F | 1111 | FFF0 | 90:00 |
| E | 3333 | FFF0 | A0:00 |
| : | : | : | : |

QUORUM DRIVE MANAGEMENT TABLE 650

| 651 | 652 | 653 | 654 |
|---|---|---|---|
| QUORUM DRIVE ID | PARTNER REAL SERIAL NUMBER | OWN VIRTUAL SERIAL NUMBER | REAL LDEV NUMBER |
| E | 2222 | FFF0 | B0:00 |
| : | : | : | : |

Fig. 18

OWN VIRTUAL PORT MANAGEMENT TABLE 510

| OWN REAL PORT ID (511) | OWN VIRTUAL PORT ID (512) | ENABLED /DISABLED (513) |
|---|---|---|
| 2A | 2A | ENABLED |
| 2A | 2X | DISABLED |
| 3A | 1X | ENABLED |

PARTNER VIRTUAL PORT MANAGEMENT TABLE 520

| PARTNER REAL SERIAL NUMBER (521) | PARTNER REAL PORT ID (522) | PARTNER VIRTUAL PORT ID (523) | ENABLED/ DISABLED (524) |
|---|---|---|---|
| 1111 | 1A | 1A | ENABLED |
| 1111 | 1A | 1X | DISABLED |
| 3333 | 4A | 2X | ENABLED |

Fig. 19

REMOTE PAIR MANAGEMENT TABLE 540

| 541 | 542 | 543 | 544 | 545 | 546 | 547 |
|---|---|---|---|---|---|---|
| OWN REAL LDEV NUMBER | PVOL /SVOL | PARTNER REAL SERIAL NUMBER | PARTNER REAL LDEV NUMBER | PARTNER REAL PORT ID | CONTROL STATE | QUORUM DRIVE ID |
| 21:00 | SVOL | 1111 | 10:00 | 1A | SPLIT (SSWS) | F |
| 21:01 | SVOL | 1111 | 10:01 | 1A | SPLIT (SSWS) | F |
| : | : | : | : | : | : | : |
| 22:00 | PVOL | 3333 | 30:00 | 4A | PAIR | E |
| 22:01 | PVOL | 3333 | 30:01 | 4A | PAIR | E |
| : | : | : | : | : | : | : |

UNIQUE INFORMATION CONVERSION TABLE 570

| | REAL UNIQUE INFORMATION | | | VIRTUAL UNIQUE INFORMATION | |
|---|---|---|---|---|---|
| 571 | 572 | 573 | 574 | 575 | 576 |
| OWN REAL PORT ID | OWN REAL LDEV NUMBER | OWN REAL SERIAL NUMBER | OWN VIRTUAL PORT ID | OWN VIRTUAL LDEV NUMBER | OWN VIRTUAL SERIAL NUMBER |
| 2A | 21:00 | 2222 | 2A | 10:00 | FFF0 |
| 2A | 21:01 | 2222 | 2A | 10:01 | FFF0 |
| 2A | 21:00 | 2222 | 2X | 10:00 | FFF0 |
| 2A | 21:01 | 2222 | 2X | 10:01 | FFF0 |
| 3A | 22:00 | 2222 | 1X | 10:00 | FFF0 |
| 3A | 22:01 | 2222 | 1X | 10:01 | FFF0 |

Fig. 21

OWN VIRTUAL PORT MANAGEMENT TABLE 610

| OWN REAL PORT ID (611) | OWN VIRTUAL PORT ID (612) | ENABLED /DISABLED (613) |
|---|---|---|
| 4A | 2X | ENABLED |

PARTNER VIRTUAL PORT MANAGEMENT TABLE 620

| PARTNER REAL SERIAL NUMBER (621) | PARTNER REAL PORT ID (622) | PARTNER VIRTUAL PORT ID (623) | ENABLED /DISABLED (624) |
|---|---|---|---|
| 2222 | 3A | 1X | ENABLED |

REMOTE PAIR MANAGEMENT TABLE 640

| OWN REAL LDEV NUMBER (641) | PVOL /SVOL (642) | PARTNER REAL SERIAL NUMBER (643) | PARTNER REAL LDEV NUMBER (644) | PARTNER REAL PORT ID (645) | CONTROL STATE (646) | QUORUM DRIVE ID (647) |
|---|---|---|---|---|---|---|
| 30:00 | SVOL | 2222 | 22:00 | 3A | PAIR | E |
| 30:01 | SVOL | 2222 | 22:01 | 3A | PAIR | E |
| : | : | : | : | : | : | : |

UNIQUE INFORMATION CONVERSION TABLE 670

| REAL UNIQUE INFORMATION | | | VIRTUAL UNIQUE INFORMATION | | |
|---|---|---|---|---|---|
| OWN REAL PORT ID (671) | OWN REAL LDEV NUMBER (672) | OWN REAL SERIAL NUMBER (673) | OWN VIRTUAL PORT ID (674) | OWN VIRTUAL LDEV NUMBER (675) | OWN VIRTUAL SERIAL NUMBER (676) |
| 4A | 30:00 | 3333 | 2X | 10:00 | FFF0 |
| 4A | 30:01 | 3333 | 2X | 10:01 | FFF0 |

Fig. 23

PATH MANAGEMENT TABLE 300

| PATH ID 311 | PATH TYPE 312 | LUN 313 | LDEV NUMBER 314 | SERIAL NUMBER 315 | PORT ID 316 | PATH STATE 317 | CURRENTLY -USED FLAG 318 |
|---|---|---|---|---|---|---|---|
| 1 | OWNER | 0 | 10:00 | FFF0 | 1A | OFFLINE | 0 |
| 2 | OWNER | 1 | 10:01 | FFF0 | 1A | OFFLINE | 0 |
| 3 | OWNER | 0 | 10:00 | FFF0 | 1X | ONLINE | 1 |
| 4 | OWNER | 1 | 10:01 | FFF0 | 1X | ONLINE | 1 |
| 5 | NON-OWNER | 0 | 10:00 | FFF0 | 2A | ONLINE | 0 |
| 6 | NON-OWNER | 1 | 10:01 | FFF0 | 2A | ONLINE | 0 |
| 7 | NON-OWNER | 0 | 10:00 | FFF0 | 2X | ONLINE | 0 |
| 8 | NON-OWNER | 1 | 10:01 | FFF0 | 2X | ONLINE | 0 |

STORAGE SYSTEM AND METHOD OF CONTROLLING THE SAME

TECHNICAL FIELD

The present invention relates to a storage system, and a method of controlling a storage system.

BACKGROUND ART

Patent Literature (PTL) 1 discloses a technique for improving the availability of an information system. Specifically, first and second storage apparatuses, coupled to a host computer, have set therein a remote copy pair for copying data of a first volume in the first storage apparatus to a second volume in the second storage apparatus, and associate a third volume in a third storage apparatus with the remote copy pair. When an I/O request to the first volume ends in an error, the host computer sends the second storage apparatus an I/O request to the second volume. When the first or second storage apparatus detects a failure in its partner first or second storage apparatus or detects a coupling failure between the first and the second storage apparatuses, the first or second storage apparatus stores in the third volume a failure information flag indicating the detection of the failure.

CITATION LIST

Patent Literature

PTL 1: US Patent Application Laid-open Publication No. 2009/0271582

SUMMARY OF INVENTION

Technical Problem

In the information system disclosed in PTL 1, when a failure occurs in the first storage apparatus, the information system is recovered to an original high-availability operational status by replacing the first storage apparatus with another storage apparatus, for example. However, information uniquely set for each storage apparatus is changed before and after the replacement. Accordingly, the host computer has to change settings or be rebooted, which affects the tasks or services provided by the host computer.

The present invention has been made in view of such background, and an object thereof is to provide a storage system capable of recovering to the high-availability operational status without affecting a host computer, and method of controlling the storage system.

Solution to Problem

One aspect of the present invention for achieving the above object is a storage system including: a first storage apparatus communicatively coupled to a host computer and capable of providing a first storage volume; a second storage apparatus communicatively coupled to the host computer and the first storage apparatus and capable of providing a second storage volume and a third storage volume; and a third storage apparatus communicatively coupled to the host computer and the second storage apparatus and capable of providing a fourth storage volume, wherein the first storage apparatus provides the host computer with a first virtual apparatus ID set for the first storage apparatus, a first virtual volume ID set for the first storage volume, and a first virtual port ID set for a network port in the first storage apparatus, as information for identifying a first path the host computer uses when sending a data I/O request to the first storage volume, the second storage apparatus provides the host computer with a second virtual apparatus ID set for the second storage apparatus, a second virtual volume ID set for the second storage volume, and a second virtual port ID set for a network port in the second storage apparatus, as information for identifying a second path the host computer uses when sending a data I/O request to the second storage volume, the second storage apparatus provides the host computer with the second virtual apparatus ID set for the second storage apparatus, a third virtual volume ID set for the third storage volume, and a third virtual port ID set for a network port in the second storage apparatus, as information for identifying a third path the host computer uses when sending a data I/O request to the third storage volume, the third storage apparatus provides the host computer with a third virtual apparatus ID set for the third storage apparatus, a fourth virtual volume ID set for the fourth storage volume, and a fourth virtual port ID set for a network port in the third storage apparatus, as information for identifying a fourth path the host computer uses when sending a data I/O request to the fourth storage volume, the first storage apparatus, the second storage apparatus, and the third storage apparatus provide the host computer with a common virtual apparatus ID as the first virtual apparatus ID, the second virtual apparatus ID, and the third virtual apparatus ID, the first storage apparatus, the second storage apparatus, and the third storage apparatus provide the host computer with a common virtual volume ID as the first virtual volume ID, the second virtual volume ID, the third virtual volume ID, and the fourth virtual volume ID, when the first storage apparatus is normally operating, the first storage apparatus receives the data I/O request from the host computer via the first path to perform data I/O to and from the first storage volume and performs management using a remote copy function for a pair of the first storage volume and the second storage volume, and when an error occurs in the first storage apparatus: the second storage apparatus starts to receive the data I/O request from the host computer via the second path, and starts to perform data I/O to and from the second storage volume, the second storage apparatus starts management using a local copy function for a pair of the second storage volume and the third storage volume; the second storage apparatus and the third storage apparatus start management using a remote copy function for a pair of the third storage volume and the fourth storage volume; the second storage apparatus starts to receive the data I/O request from the host computer via the third path and starts to perform data I/O to and from the third storage volume; and the third storage apparatus starts to receive the data I/O request from the host computer via the fourth path and starts to perform data I/O to and from the fourth storage volume.

Other problems disclosed in the present specification and the solutions thereof are made clear in the section of Description of Embodiments, drawings, and the like.

Advantageous Effects of Invention

According to the present invention, the storage system can be recovered to a high-availability operational status without affecting the host computer.

BRIEF DESCRIPTION OF DRAWINGS

FIG. 3 shows an example of a path management table 300.

FIG. 4 is a diagram showing various tables managed in a first storage apparatus 10.

FIG. 5 is a diagram showing various tables managed in a second storage apparatus 10.

FIG. 6 is a diagram for explaining an overview of processing performed in the storage system 1 in a time-series order.

FIG. 8 shows an example of the path management table 300.

FIG. 9 shows an example of the remote pair management table 540.

FIG. 15 shows examples of a quorum drive management table 550 and a quorum drive management table 650.

FIG. 18 shows examples of an own virtual port management table 510 and a partner virtual port management table 520.

FIG. 19 shows examples of a remote pair management table 540 and a unique information conversion table 570.

FIG. 21 shows examples of an own virtual port management table 610, a partner virtual port management table 620, a remote pair management table 640, and a unique information conversion table 670.

FIG. 23 shows an example of the path management table 300.

DESCRIPTION OF EMBODIMENTS

Hereinafter, an embodiment will be described with reference to the drawings.

Figure 1:
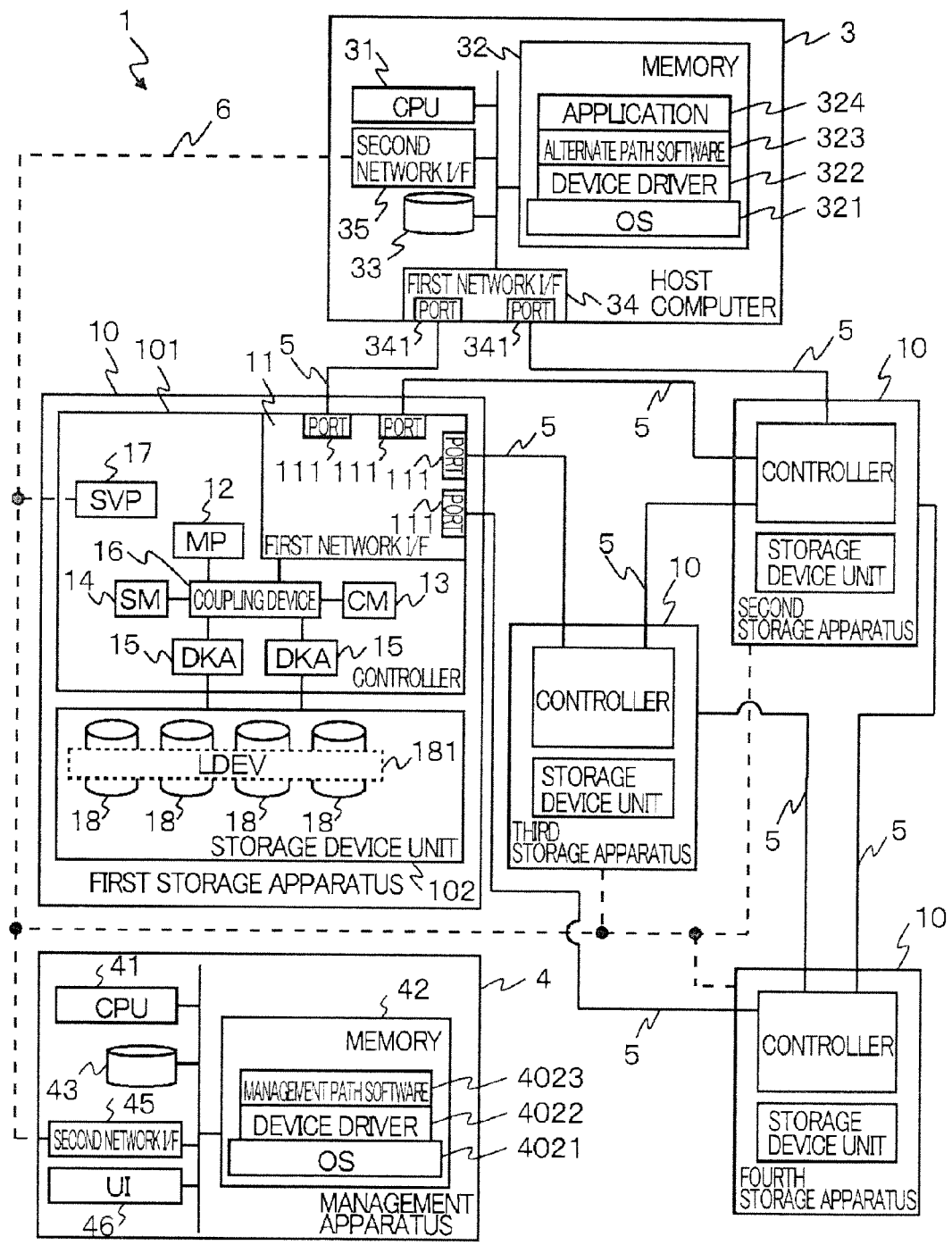
FIG. 1 is a diagram showing a schematic configuration of a storage system 1.

FIG. 1 shows a schematic configuration of a storage system 1 which will be described as one embodiment. As shown in FIG. 1, the storage system 1 includes one or more host computers 3 (external apparatuses), four storage apparatuses 10 (hereinafter, each of which are referred to as a first storage apparatus 10, a second storage apparatus 10, a third storage apparatus 10, and a fourth storage apparatus 10), and a management apparatus 4. Note that, the four storage apparatuses 10 described above are simply collectively called the storage apparatus 10 in the explanation below.

The host computer 3 is a computer which provides services such as automated teller services in banks and Web page browsing services in the Internet, for example. The storage apparatus 10 is an apparatus which provides a data storage area for an application program or the like executed in the host computer 3, and is a disk array apparatus, for example.

The host computer 3 is communicatively coupled to each of the first storage apparatus 10 and the second storage apparatus 10 via a first communication network 5. Furthermore, the first storage apparatus 10, the second storage apparatus 10, the third storage apparatus 10, and the fourth storage apparatus 10 are communicatively coupled to one another via the first communication network 5.

The first communication network 5 is, for example, a LAN (Local Area Network), a WAN (Wide Area Network), a SAN (Storage Area Network), the Internet, a public communication network, lease line, or the like. Furthermore, communication between the host computer 3 and the storage apparatus 10 is performed in accordance with a protocol such as TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), and FIBARC (Fibre Connection Architecture) (registered trademark), for example.

The management apparatus 4 is communicatively coupled to each of the host computer 3, the first storage apparatus 10, the second storage apparatus 10, the third storage apparatus 10, and the fourth storage apparatus 10 via a second communication network 6. The second communication network 6 is, for example, a LAN, a WAN, the Internet, a public communication network, lease lines, or the like.

When accessing the storage area provided by the storage apparatus 10, the host computer 3 sends a data frame (hereinafter, abbreviated as frame) including a data I/O request (a data write request, a data read request, or the like) to the storage apparatus 10. The frame sent from the host computer 3 to the storage apparatus 10 is a frame of a fibre channel (FC frame (FC: Fibre Channel)), for example.

As shown in FIG. 1, the host computer 3 includes a CPU 31 (CPU: Central Processing Unit), a memory 32 (RAM (Random Access Memory), ROM (Read Only Memory), NVRAM (Non Volatile RAM), or the like), a storage device 33 (HDD (Hard Disk Drive), a semiconductor memory (SSD (Solid State Drive), or the like), a first network interface (hereinafter, referred to as first network I/F 34), and a second network interface (hereinafter, referred to as second network I/F 35). As shown in FIG. 1, the first network I/F 34 includes multiple network ports 341 for coupling to the first communication network 5.

Among these components, the first network I/F 34 is an interface for coupling to the first communication network 5, and is, for example, an HBA (Host Bus Adapter), an NIC (Network Interface Card), or the like. Furthermore, the second network I/F 35 is an interface for coupling to the second communication network 6, and is an NIC, for example. Specific examples of the host computer 3 include a personal computer, a mainframe, an office computer, and the like.

As shown in FIG. 1, the memory 32 (or the storage device 33) in the host computer 3 stores programs such as an operating system (hereinafter, referred to as OS 321), a device driver 322, alternate path software (hereinafter, referred to as alternate path software 323), and an application program 324. When the CPU 31 in the host computer 3 reads and executes the programs stored in the memory 32 (or the storage device 33), various functions provided by the host computer 3 are implemented.

The alternate path software 323 is a program for implementing functions related to setting of a path being a route followed by the data I/O request when the host computer 3 sends the data I/O request to the storage apparatus 10, or a selection of a path to be used (switching (alternating) a path).

As shown in FIG. 1, the storage apparatus 10 includes a controller 101 and a storage device unit 102. The controller 101 includes one or more first communication I/Fs 11, one or more microprocessors (hereinafter, referred to as MP 12), a cache memory (hereinafter, referred to as CM 13 (CM: Cache Memory)), a shared memory (hereinafter, referred to as SM 14 (SM: Shared Memory)), one or more disk adapters (hereinafter, referred to as DKA 15 (DKA: Disk Adaptor) (drive controller), a coupling device 16, and a maintenance device (hereinafter, referred to as SVP 17 (SVP: SerVice Processor)). As shown in FIG. 1, the first communication I/F 11, the MP 12, the CM 13, the SM 14, and the DKA 15 are communicatively coupled to one another via the coupling device 16.

The first communication I/F 11 (front-end) is an interface for coupling to the first communication network 5. As shown in FIG. 1, the first communication I/F 11 includes a plurality of network ports 111 for coupling to the first communication network 5. The first communication I/F 11 receives a frame sent from the host computer 3, and sends the host computer 3 a frame including a response of processing (for example, data read from the storage device unit 102, a read completion report, and a write completion report) related to the data I/O request included in the received frame.

The MP 12 includes a CPU, an MPU (Micro Processing Unit), a DMA (DMA: Direct Memory Access), or the like. In response to the data I/O request included in the frame which the first communication I/F 11 has received from the host computer 3, the MP 12 transfers data at high speed among the first communication I/F 11, the CM 13, the SM 14, and the DKA 15. This data transfer is performed, for example, at the time of passing data read from the storage device unit 102 (hereinafter, referred to as read data), passing data to be written into the storage device unit 102 (hereinafter, referred to as write data), and staging (reading of the data from the storage device unit 102 to the CM 13) and destaging (writing of the data into the storage device unit 102 from the CM 13) by the CM 13.

The CM 13 (cache memory) includes a RAM, a ROM, an NVRAM, or the like. The CM 13 temporally stores data being a target of the data I/O request.

The SM 14 includes a RAM, a ROM, an NVRAM, or the like. The SM 14 stores data used for controlling processing related to the data I/O request (hereinafter, referred to as control information).

The DKA 15 communicates with the storage device unit 102 when data is read from the storage device unit 102 and when data is written into the storage device unit 102.

The coupling device 16 includes a high-speed cross bar switch or a bus, for example. Communication via the coupling device 16 is performed in accordance with a protocol such as Fibre Channel, iSCSI, and TCP/IP, for example.

The storage device unit 102 includes multiple storage drives 18 which are physical storage media. Each of the storage drives 18 is, for example, a hard disk drive (a hard disk drive in conformity to the standards such as SAS (Serial Attached SCSI), SATA (Serial ATA), FC (Fibre Channel), PATA (Parallel ATA), or SCSI), or a semiconductor storage device (SSD). The storage device unit 102 may be housed in the same enclosure as the storage apparatus 10, or may be housed in an enclosure which is different from an enclosure in which the storage apparatus 10 is housed.

The storage device unit 102 provides the host computer 3 with a storage area in units of logical device (LDEV 181 (LDEV: Logical Device)) which is configured using an RAID (Redundant Arrays of Inexpensive (or Independent) Disks) group (Parity Group) based on the storage areas in the storage drives 18.

The storage apparatus 10 provides the host computer 3 with a logical storage area (hereinafter, referred to as LU (Logical Unit, Logical Volume) (storage volume) configured using the LDEV 181. The storage apparatus 10 manages correspondence between the LU and the LDEV 181. The relation between the LU and the LDEV 181 may be a relation of one-to-one or one-to-a plurality.

A unique identifier (hereinafter, referred to as LUN (Logical Unit Number)) is assigned to each LU. The host computer 3 specifies a storage area to be accessed by setting a LUN and a block address to a frame to be sent to the storage apparatus 10. Upon receiving the data I/O request from the host computer 3, the storage apparatus 10 identifies the LDEV 181 configuring the specified LU, and performs processing specified in the data I/O request.

The SVP 17 includes a personal computer, an office computer, or the like. The SVP 17 communicates with the components (the first communication I/F 11, the MP 12, the CM 13, the SM 14, the DKA 15, and the storage device unit 102) in the storage apparatus 10, via the coupling device 16 or a communication means provided separate from the coupling device 16. The SVP 17 is coupled to the second communication network 6, and communicates with the management apparatus 4, the host computer 3, and the storage apparatus 10. The SVP 17 collects information that is used for performance monitoring or state monitoring of the storage apparatus 10, and provides the management apparatus 4 with the collected information as needed. Furthermore, the SVP 17 sets the storage apparatus 10 or controls the storage apparatus 10, spontaneously or passively in response to the command sent from the management apparatus 4.

As shown in FIG. 1, the management apparatus 4 includes a CPU 41, a memory 42 (RAM, ROM, NVRAM, or the like), a storage device 43 (HDD, a semiconductor storage device (SSD), or the like), a second network interface (hereinafter, referred to as second network I/F 45) (NIC or the like), and a user interface (hereinafter, referred to as UI 46) (a keyboard, a mouse, a touchpanel, a liquid crystal monitor, an organic EL panel, or the like).

As shown in FIG. 1, the memory 42 or the storage device 43 in the management apparatus 4 stores programs such as an operating system (hereinafter, referred to as OS 4021), a device driver 4022, and management path software (hereinafter, referred to as management path software 4023).

<Basic Function of Storage Apparatus>

Next, basic processing performed by the storage apparatus 10 when the storage apparatus 10 receives a data I/O request from the host computer 3 will be described.

Firstly, processing performed by the storage apparatus 10 when the storage apparatus 10 receives a frame including a data write request from the host computer 3 will be described. Upon receiving the frame, the first communication I/F 11 in the storage apparatus 10 notifies the MP 12 of the reception. When receiving the notification from the first communication I/F 11, the MP 12 creates a drive write request based on the data write request in the frame, stores the created write data in the CM 13, and responds by notifying the first communication I/F 11 that the notification has been received. Furthermore, the MP 12 sends the created drive write request to the DKA 15.

Upon receiving the response from the MP 12, the first communication I/F 11 sends a completion report to the host computer 3. When receiving the drive write request from the MP 12, the DKA 15 registers the received drive write request in a write processing queue.

The DKA 15 reads the drive write request from the write processing queue as needed. Furthermore, the DKA 15 reads, from the CM 13, the write data specified in the drive write request thus read, and writes the write data thus read in the storage drive 18. Furthermore, the DKA 15 notifies the MP 12 by reporting that the writing of the write data specified in the drive write request has been completed (completion report). The MP 12 receives the completion report sent from the DKA 15.

When the storage apparatus 10 receives the frame including the data write request from the host computer 3, data is written to the storage drives 18 basically in accordance with the flow described above.

Next, processing performed by the storage apparatus 10 when the storage apparatus 10 receives a frame including a data read request from the host computer 3 will be described. Upon receiving the frame sent from the host computer 3, the first communication I/F 11 notifies the DKA 15 of the reception. When receiving the notification from the first communication I/F 11, the DKA 15 reads, from the storage drives 18, data specified in the data read request included in the frame (for example, specified in LBA (Logical Block Address)). Note that, when the read data is present in the CM 13 (when staging has been performed), the reading from the storage drives 18 is omitted.

The MP 12 writes the data read by the DKA 15 into the CM 13, and transfers the data having been written into the CM 13 to the first communication I/F 11 as needed.

The first communication I/F 11 receives the read data sent from the MP 12, and transmits the received read data to the host computer 3. When the transmission of the read data to the host computer 3 is completed, the first communication I/F 11 sends a completion report to the host computer 3.

When the storage apparatus 10 receives the frame including the data read request from the host computer 3, the data is read from the storage drive 18 basically in accordance with the flow described above.

<Local Copy Function>

The storage apparatus 10 is provided with a mechanism (hereinafter, referred to as local copy function) in which duplication of data that is stored in a certain LU (hereinafter, referred to as source LU), is also stored in a LU (hereinafter, referred to as target LU) different from the certain LU. The local copy function is used in the storage apparatus 10 in order to ensure safety and integrity of data and the like. The local copy function is achieved by hardware included in the storage apparatus 10 or by the MP 12 in the storage apparatus 10 reading and executing a program stored in the shared memory (the SM 14). Note that, as described above, because the LUs are configured using the LDEVs 181, duplication between the LUs in the local copy function is performed by duplicating data between the LDEVs 181 configuring the respective LUs.

The storage apparatus 10 manages local pair management information, local pair difference information (source), and local pair difference information (target), as tables related to the local copy function. These pieces of information are stored, for example, in the shared memory (the SM 14) in the storage apparatus 10.

The local pair management information includes mapping between a source LU and a target LU (hereinafter, a pair of a source LU and a target LU mapped to the source LU is referred to as local pair), and control states of the local pair.

Note that, an operator manipulates the management apparatus 4 to set contents of the local pair management information, for example.

Main examples of the control states of the local pair include a pair state, a split state, and a re-sync state.

In the pair state, duplication from the source LU to the target LU is performed in real time. In other words, if data in the source LU is changed by the data I/O request from the host computer 3, the changed data is also immediately reflected in the target LU.

In the split state, even if data in the source LU is changed, the changed data is not immediately reflected in the target LU, but is reflected in the target LU at a timing when the local pair is transitioned from the split state to the pair state (hereinafter, referred to as re-sync). Note that, when change of data of the target LU is allowed in the split state, the data of the target LU is reflected in the source LU at the timing of re-sync of the local pair.

In the local pair difference information (source), managed is whether or not data in each of the data blocks in the source LU is changed during a period when the local pair is in the split state. The local pair difference information (source) includes, for example, a set of bits corresponding to the respective data blocks in the source LU. For example, when data in a certain data block in the source LU is changed by the data I/O request from the host computer 3, a bit corresponding to the data block is set ON (set). Meanwhile, when the re-sync is completed, the corresponding bit is set OFF (reset).

In the local pair difference information (target), managed is whether or not data in each of the data blocks in the target LU is changed during a period when the local pair is in the split state. The local pair difference information (target) includes, for example, a set of bits corresponding to respective data blocks in the target LU. For example, when data in a certain data block in the target LU is changed by the data I/O request from the host computer 3, a bit corresponding to the data block is turned ON (set). Meanwhile, when the re-sync is completed, the corresponding bit is turned OFF (reset).

The control state of the local pair can be changed from the management apparatus 4. For example, when the management apparatus 4 sends a command to cause a local pair to transition to the split state (hereinafter, referred to as split command), the storage apparatus 10 causes the control state of the local pair to transition from the pair state to the split state. Furthermore, when the management apparatus 4 sends a command to cause a local pair in a split state to transition to the pair state (hereinafter, referred to as re-sync command), the storage apparatus 10 causes the control state of the local pair to transition from the split state to the pair state.

<Remote Copy Function>

The storage apparatus 10 includes a function (hereinafter, referred to as remote copy function) in which duplication of data stored in a certain LU (hereinafter, referred to as primary LU) in the storage apparatus 10 (hereinafter, referred to as primary apparatus) is further stored in a LU (hereinafter, referred to as secondary LU) in another storage apparatus 10 (hereinafter, referred to as secondary apparatus) different from the storage apparatus 10 being the primary apparatus. The remote copy function is achieved by hardware included in each of the storage apparatuses 10 or by the MP 12 in each storage apparatus 10 reading and executing a program stored in the shared memory (the SM 14). Note that, because the LUs are configured using the LDEVs 181, duplication between the LUs in the remote copy function is performed by duplicating data between the LDEVs 181 configuring the respective LUs in storage apparatuses 10.

The remote copy function is employed in the storage apparatus 10 in order to ensure safety and integrity of data and the like. The remote copy function is achieved by hardware included in the storage apparatus 10, or, by the MP 12 in the storage apparatus 10 reading and executing a program stored in the SM 14.

The storage apparatus 10 manages remote pair management information, remote pair difference information (primary), and remote pair difference information (secondary), as tables related to the remote copy function. Note that, these pieces of information are stored, for example, in the shared memory (the SM 14) in the storage apparatus 10.

The remote pair management information includes mapping between a primary LU in the primary apparatus and a secondary LU in the secondary apparatus (hereinafter, a pair of a primary LU in the primary apparatus and a secondary LU, mapped to primary LU, in the secondary apparatus is referred to as a remote pair), and control states of the remote pair. Note that, an operator manipulates the management apparatus 4 to set the contents of the remote pair management information, for example.

Main examples of the control states of the remote pair include a pair state, a split state, and a re-sync state.

In the pair state among the control states, duplication from the primary LU to the secondary LU is performed in real time. In other words, when data in the primary LU is changed by the data I/O request from the host computer 3, the changed data is also immediately reflected in the secondary LU.

In the split state, even if data in the primary LU is changed, the changed data in not immediately reflected in the secondary LU, but are reflected in the secondary LU at a timing when the remote pair is transitioned from the split state to the pair state (hereinafter, referred to as re-sync). Note that, when change of data in the secondary LU is allowed in the split state, the data in the secondary LU is reflected in the primary LU at the timing of re-sync of the remote pair.

In the remote pair difference information (primary), managed is whether or not data in each of the data blocks in the primary LU is changed during a period when the remote pair is in a split state. The remote pair difference information (primary) includes, for example, a set of bits corresponding to the respective data blocks in the primary LU. For example, when data in a certain data block in the primary LU is changed by the data I/O request from the host computer 3, a bit corresponding to the data block is turned ON (set). Meanwhile, when the re-sync is completed, the corresponding bit is turned OFF (reset).

In the remote pair difference information (secondary), managed is whether or not data in each of the data blocks in the secondary LU is changed during a period when the remote pair is in a split state. The remote pair difference information (secondary) includes, for example, a set of bits corresponding to the respective data blocks in the secondary LU. For example, when data in a certain data block in the secondary LU is changed by the data I/O request from the host computer 3, a bit corresponding to the data block is turned ON (set). Meanwhile, when the re-sync is completed, the corresponding bit is turned OFF (reset).

The control state of each remote pair can be changed by a command from the management apparatus 4, for example. In other words, when a command to cause a remote pair to transition to the split state (hereinafter, referred to as split command) is issued by the management apparatus 4, the storage apparatus 10 causes the control state of the remote pair to transition from the pair state to the split state. Furthermore, when a command to cause a remote pair in a split state to transition to the pair state (hereinafter, referred to as re-sync command) is issued by the management apparatus 4, the storage apparatus 10 causes the control state of the remote pair to transition from the split state to the pair state.

Furthermore, as for each remote pair, a control method thereof can be set to be a synchronous method or an asynchronous method. An operator manipulates the management apparatus 4 to set the control method, for example.

In the synchronous method, upon receiving from the host computer 3 a data write request to the primary LU, the primary apparatus writes data specified in the data write request into the primary LU. Furthermore, the primary apparatus sends data same as the written data to the secondary apparatus. Upon receiving the data from the primary apparatus, the secondary apparatus writes the received data into the secondary LU, and notifies the primary apparatus that the received data has been written. Upon receiving the notification, the primary apparatus sends a completion notification to the host computer 3.

In this manner, in the synchronous method, the completion notification is sent to the host computer 3 after it is confirmed that the data has been written into both the primary LU and the secondary LU. Accordingly, in the synchronous method, at the time when the host computer 3 receives the completion notification, coincidence between the data in the primary LU and the data in the secondary LU is always secured.

On the other hand, in the case of the asynchronous method, upon receiving from the host computer 3 a data write request to the primary LU, the primary apparatus writes data specified in the data write request into the primary LU, and sends a completion notification to the host computer 3. Furthermore, the primary apparatus sends data same as the written data to the secondary apparatus. Upon receiving the data from the primary apparatus, the secondary apparatus writes the received data into the secondary LU, and notifies the primary apparatus that the received data has been written.

In this manner, in the case of the asynchronous method, upon writing the data in the primary LU, the primary apparatus sends a completion notification to the host computer 3 irrelevant to whether or not the data has been written into the secondary LU. Therefore, coincidence between the data in the primary LU and the data in the secondary LU is not always secured, which is different from the synchronous method.

<Unique Information Virtualization Function>

The storage apparatus 10 includes the following function (hereinafter, referred to as unique information virtualization function). In a case where the remote copy function described above is performed, information (hereinafter, referred to as unique information) is virtualized and shown to the host computer 3 when the host computer 3 sends the data I/O request to the secondary apparatus, the information being referred to in order to identify a target of the data I/O request. The unique information virtualization function is achieved by hardware included in each storage apparatus 10, or, by the MP 12 in each storage apparatus 10 reading and executing a program stored in the shared memory (the SM 14).

Here, the unique information is information included in inquiry information which is information used as a response from the storage apparatus 10 to the host computer 3 when the host computer 3 sends to the storage apparatus 10 an inquiry command complying with the SCSI (Small Computer System Interface) standard, for example.

Specific examples of unique information include the network port 111 in the first communication I/F 11, a serial number assigned to the storage apparatus 10 (an identification number assigned to each storage apparatus 10 by a manufacturer, a vendor, or the like, of the storage apparatus 10) (apparatus ID), and the like. Note that, in the explanation below, unique information that is actually assigned to an apparatus is called real unique information, and virtualized unique information that is shown to the host computer 3 is called virtual unique information.

The unique information virtualization function is used, for example, when an error occurs in the primary apparatus, so that the secondary apparatus can take over (a failover can be performed) the service having been provided to the host computer 3 by the primary apparatus only by switching a path with the alternate path software 323 in the host computer 3.

Figure 2:
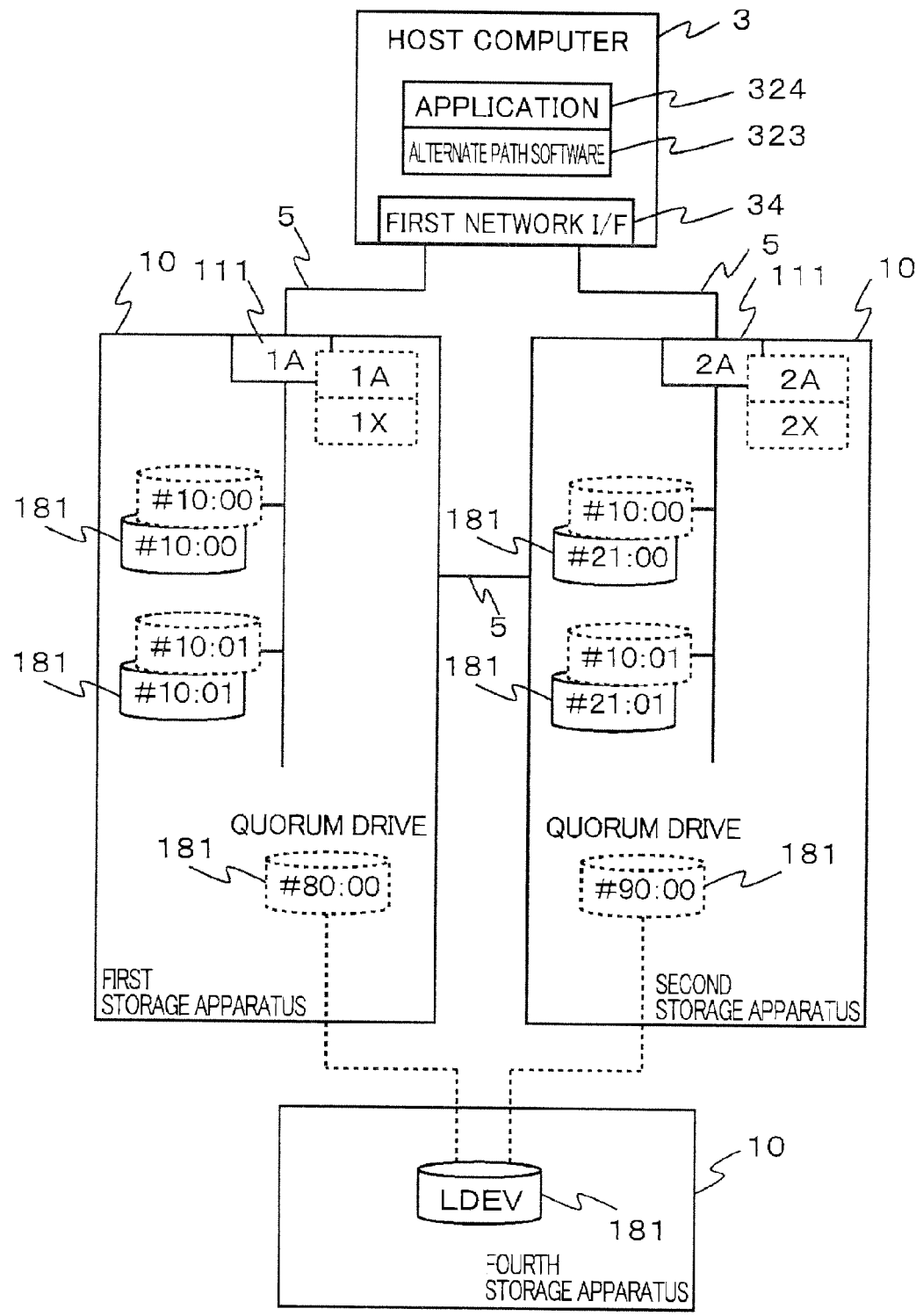
FIG. 2 is a diagram for explaining a unique information virtualization function in detail.

FIG. 2 is a diagram for explaining the unique information virtualization function in detail, and is a schematic diagram of the storage system 1 illustrated in a simplified manner. As shown in FIG. 2, the storage system 1 includes a first storage apparatus 10 with serial number "1111", and a second storage apparatus 10 with serial number "2222".

The first storage apparatus 10 has a network port 111 with identifier (hereinafter, referred to as port ID) "1A" which is coupled to the host computer 3, and LDEVs 181 with identifiers (hereinafter, referred to as LDEV numbers) "#10:00" and "#10:01", respectively. Furthermore, the second storage apparatus 10 has a network port 111 with port ID "2A" which is coupled to the host computer 3, and LDEVs 181 with LDEV numbers "#21:00" and "#21:01", respectively.

In the storage system 1 shown in FIG. 2, a remote copy function is employed in which the first storage apparatus 10 is set as the primary apparatus and the second storage apparatus 10 is set as the secondary apparatus. The LDEVs 181 (LDEVs 181 with LDEV numbers "#10:00" and "#10:01") in the first storage apparatus 10 configure the primary LU, and the LDEVs 181 (LDEVs 181 with LDEV numbers "#21:00" and "#21:01") in the second storage apparatus 10 configure the secondary LU.

Data is transferred between the LDEV 181 with LDEV number "#10:00" in the first storage apparatus 10 and the LDEV 181 with LDEV number "#21:00" in the second storage apparatus 10 to make the data therein equal to each other by the remote copy function. Furthermore, data is transferred between the LDEV 181 with LDEV number "#10:01" in the first storage apparatus 10 and the LDEV 181 with LDEV number "#21:01" in the second storage apparatus 10 to make the data therein to equal to each other by the remote copy function.

Furthermore, the unique information virtualization function of the first storage apparatus 10 shows "FFF0" to the host computer 3 as its own serial number (first virtual apparatus ID), "FFF0" being a serial number (hereinafter, referred to as virtual serial number (virtual apparatus ID)) virtually set for "1111" which is a serial number actually assigned to the first storage apparatus 10 (hereinafter, referred to as real serial number). Accordingly, for example, when the host computer 3 sends the inquiry command, the first storage apparatus 10 returns "FFF0" as its own serial number to the host computer 3.

In addition, the unique information virtualization function of the second storage apparatus 10 shows "FFF0" (the same virtual serial number as the virtual serial number which the first storage apparatus 10 is showing to the host computer 3) to the host computer 3 as its own serial number (second virtual apparatus ID), "FFF0" being a serial number virtually set for "2222" which is a serial number actually assigned to the second storage apparatus 10 (hereinafter, referred to as real serial number). Accordingly, for example, when the host computer 3 sends the inquiry command, the second storage apparatus 10 returns "FFF0" as its own serial number to the host computer 3, "FFF0" being the same virtual serial number as the virtual serial number which the first storage apparatus 10 is showing to the host computer 3.

Moreover, the unique information virtualization function of the first storage apparatus 10 shows "#10:00" to the host computer 3 as the LDEV number of its own LDEV 181 (first virtual volume ID), "#10:00" being a LDEV number (hereinafter, referred to as virtual LDEV number) virtually set for "#10:00" which is a LDEV number actually assigned to the LDEV 181 of the first storage apparatus 10 (hereinafter, referred to as real LDEV number). Accordingly, for example, when the host computer 3 sends the inquiry command, the first storage apparatus 10 returns "#10:00" as the LDEV number of the LDEV 181 which the first storage apparatus 10 manages.

Moreover, the unique information virtualization function of the first storage apparatus 10 shows "#10:01" to the host computer 3 as the LDEV number of its own LDEV 181 (second virtual volume ID), "#10:01" being a virtual LDEV number virtually set for "#10:01" which is a real LDEV number assigned to the LDEV 181 of the first storage apparatus 10. Accordingly, for example, when the host computer 3 sends an inquiry command, the first storage apparatus 10 returns "#10:01" as the LDEV number of the LDEV 181 which the first storage apparatus 10 manages.

Moreover, the unique information virtualization function of the second storage apparatus 10 shows "#10:00" to the host computer 3 as the LDEV number of its own LDEV 181, "#10:00" being a virtual LDEV number virtually set for "#21:00" which is a real LDEV number assigned to the LDEV 181 of the second storage apparatus 10, and being the same virtual LDEV number as the LDEV number of the LDEV 181 of the first storage apparatus 10. Accordingly, for example, when the host computer 3 sends an inquiry command, the second storage apparatus 10 returns "#10:00" as the LDEV number of the LDEV 181 which the second storage apparatus 10 manages, "#10:00" being the same virtual LDEV number as the virtual LDEV number which the first storage apparatus 10 is showing the host computer 3.

Moreover, the unique information virtualization function of the second storage apparatus 10 shows "#10:01" to the host computer 3 as the LDEV number of its own LDEV 181, "#10:01" being a virtual LDEV number virtually set for "#21:01" which is a real LDEV number assigned to the LDEV 181 of the second storage apparatus 10, and being the same virtual LDEV number as the LDEV number of the LDEV 181 of the first storage apparatus 10. Accordingly, for example, when the host computer 3 sends the inquiry command, the second storage apparatus 10 returns "#10:01" as the LDEV number of the LDEV 181 which the second storage apparatus 10 manages, "#10:01" being the same virtual LDEV number as the virtual LDEV which the first storage apparatus 10 is showing the host computer 3.

Furthermore, the unique information virtualization function of the first storage apparatus 10 shows "1A" and "1X" to the host computer 3 as its own port IDs (first virtual port IDs), "1A" and "1X" being port IDs (hereinafter, referred to as virtual port IDs) virtually set for "1A" which is a port ID actually assigned to the network port 111 of the first storage apparatus 10 (hereinafter, referred to as real port ID). Accordingly, for example, when the host computer 3 sends an inquiry command, the first storage apparatus 10 returns virtual port ID "1A" or "1X" as its own port ID.

Furthermore, the unique information virtualization function of the second storage apparatus 10 shows "2A" and "2X" to the host computer 3 as its own port IDs (second virtual port IDs), "2A" and "2X" being virtual port IDs virtually set for "2A" which is a real port ID assigned to the network port 111 of the second storage apparatus 10. Accordingly, for example, when the host computer 3 sends an inquiry command, the second storage apparatus 10 returns virtual port ID "2A" or "2X" as its own port ID.

Here, the settings described above are made in the storage system 1, the remote copy function is employed for the LDEVs 181 in the first storage apparatus 10 and the LDEVs 181 in the second storage apparatus 10 as described above, and both the first storage apparatus 10 and the second storage apparatus 10 show the same LDEV number (virtual LDEV number) to the host computer 3. Therefore, the host computer 3 sees as if a storage apparatus 10 with serial number (virtual serial number) "FFF0" exists, and each of the LDEVs 181 with respective LDEV numbers "#10:00" and "#10:01" is provided with a plurality of paths (a path including network port 111 with real port ID "1A" (hereinafter, referred to as first path) and a path including network port 111 with real port ID "2A" (hereinafter, referred to as second path)).

Accordingly, for example, when an error occurs in the first storage apparatus 10 in a state where the first storage apparatus 10 is receiving the data I/O request sent from the host computer 3, a rapid and easy failover from the first storage apparatus 10 to the second storage apparatus 10 can be performed simply by switching a path so that the data I/O request from the host computer 3 is sent to the second storage apparatus 10 (switching from the first path to the second path).

Note that, a data transfer does not occur between the LDEVs 181 in the failover because the remote copy function is employed for the LDEVs 181 in the first storage apparatus 10 and the LDEVs 181 in the second storage apparatus 10. Furthermore, because both the first storage apparatus 10 and the second storage apparatus 10 show to the host computer 3 a common (same) virtual serial number and a common (same) virtual LDEV number, the settings of the unique information do not have to be changed and the host computer 3 does not have to be rebooted to reflect the unique information. Thus, the failover can be performed without affecting the service of the host computer 3.

<Table in Host Computer>

FIG. 3 shows a table managed in the host computer 3, and is a table (hereinafter, referred to as path management table 300) in which information related to a path to be used when the host computer 3 accesses the storage apparatus 10 is managed. The path management table 300 is stored, for example, in the memory 32 or the storage device 33 in the host computer 3.

As shown in the FIG. 3, the path management table 300 has one or more records including items of path ID 311, path type 312, LUN 313, LDEV number 314, serial number 315, port ID 316, path state 317, and currently-used flag 318. For example, the host computer 3 acquires setting contents of the items in the path management table 300 by sending an inquiry such as an inquiry command to the storage apparatus 10 as needed. Note that, an operator or the like can set the contents of items in the path management table 300 from the management apparatus 4.

In the path ID 311, an identifier assigned to each path (hereinafter, referred to as path ID) is set. Eight paths are managed in the path management table 300 shown in FIG. 3.

In path type 312, information indicating whether a path is an owner path or a non-owner path is set. Here, the owner path is a path preferentially used compared to the non-owner path. Under the circumstance where both the owner path and the non-owner path are available, the host computer 3 preferentially uses the owner path to send the data I/O request to the storage apparatus 10. The non-owner path is set as a standby path of the owner path, for example, to achieve a redundant configuration. As shown in FIG. 3, "Owner" is set for the owner path in path type 312, while "Non-Owner" is set for the non-owner path in path type 312.

Note that, the eight paths with respective path IDs "1" to "8" are set in the path management table 300 shown in FIG. 3. Among the paths, paths with respective path IDs "1" to "4" are set as owner paths. Meanwhile, paths with respective path IDs "5" to "8" are set as non-owner paths.

In LUN 313, a LUN of a LU being a target of a certain path (an access target when the certain path is used) is set.

In LDEV number 314, a LDEV number of the LDEV 181 being a target of the certain path (an access target when the certain path is used) is set. Note that, when the storage apparatus 10 is showing a virtual LDEV number to the host computer 3 by the unique information virtualization function described above, the virtual LDEV number is set in LDEV number 314.

In serial number 315, a serial number of the storage device 10 providing a LU (or the LDEV 181) being a target of the certain path (an access target when this path is used) is set.

In port ID 316, a port ID of the network port 111 of the storage device 10 which configures the certain path is set. Note that, when the storage apparatus 10 is showing a virtual port ID to the host computer 3 by the unique information virtualization function described above, a virtual port ID is set in port ID 316.

In path state 317, information indicating whether or not the certain path is currently available (online or offline) is set. If the certain path is available, "Online" is set, while if the certain path is not available, "Offline" is set. For example, when there is an error in the first communication network 5 or in the storage apparatus 10, "Offline" is set in path state 317.

In currently-used flag 318, information indicating whether or not the certain path is currently used to actually send the data I/O request is set. If the certain path is currently used to actually send the data I/O request. "1" is set, while if the certain path is not currently used, "0" is set.

<Table in First Storage Apparatus>

FIG. 4 shows various tables managed in the first storage apparatus 10. As shown in FIG. 4, the first storage apparatus 10 manages own virtual port management table 410, partner virtual port management table 420, LU management table 430, remote pair management table 440, quorum drive management table 450, serial number management table 460, and unique information conversion table 470. These tables are stored in the shared memory (the SM 14) in the first storage apparatus 10, for example. An operator manipulates the management apparatus 4 to set the contents of the tables, for example.

As shown in FIG. 4, the own virtual port management table 410 has one or more records each including items of own real port ID 411, own virtual port ID 412, and enabled/disabled 413.

Among the items, in own real port ID 411, a real port ID of a certain network port 111 in the first storage apparatus 10 is set. In own virtual port ID 412, a virtual port ID set for the real port ID is set.

In enabled/disabled 413, information indicating whether or not the certain network port 111 is currently available is set. If the certain network port 111 is available, "Enabled" is set, while if the certain network port 111 is not available, "Disabled" is set. For example, when an operator has manipulated the management apparatus 4 to disable the certain network port 111, "Disabled" is set in enabled/disabled 413. Furthermore, when there is an error in a communication function of the first communication network 5 or the storage apparatus 10

(the first storage apparatus 10 or the second storage apparatus 10), "Disabled" is also set in enabled/disabled 413.

As shown in FIG. 4, the partner virtual port management table 420 has one or more records each including items of partner serial number 421, partner real port ID 422, partner virtual port ID 423, and enabled/disabled 424.

Among the items, in partner serial number 421, a serial number of the second storage device 10 is set, the second storage device 10 being the secondary device which is the partner of this first storage device 10 being the primary device in the remote copy function.

In partner real port ID 422, a real port ID of a certain network port 111 of the second storage device 10 being the secondary device is set. In partner virtual port ID 423, a virtual port ID set for the real port ID is set.

In enabled/disabled 424, information indicating whether or not the certain network port 111 is currently available is set. If the certain network port 111 is available, "Enabled" is set, while if the certain network port 111 is not available, "Disabled" is set. For example, when an operator has manipulated the management apparatus 4 to disable the certain network port 111, "Disabled" is set in enabled/disabled 424. Furthermore, when there is an error in the first communication network 5 or the storage apparatus 10, "Disabled" is also set in enabled/disabled 424.

In the LU management table 430 shown in FIG. 4, a correspondence between the LUs and the LDEVs 181 (the LDEVs 181 configuring the LUs) in the first storage apparatus 10 is managed. As shown in FIG. 4, the LU management table 430 has one or more records each including items of a LUN 431 and an own real LDEV number 432.

Among the items, in the LUN 431, a LUN of a LU provided to the host computer 3 is set. In the own real LDEV number 432, a real LDEV number of the LDEV 181 in the first storage device 10 configuring the LU is set.

In the remote pair management table 440 shown in FIG. 4, correspondence between the LDEV 181 configuring the primary LU in the primary apparatus (the first storage apparatus 10) and the LDEV 181 configuring the secondary LU in the secondary apparatus (the second storage apparatus 10) is managed.

As shown in FIG. 4, the remote pair management table 440 has one or more records each including items of own real LDEV number 441, PVOL/SVOL 442, partner real serial number 443, partner real LDEV number 444, partner real port ID 445, control state 446, and quorum drive ID 447.

Among the items, in the own real LDEV number 441, a real LDEV number of a certain LDEV 181 in the first storage apparatus 10 is set.

In the PVOL/SVOL 442, information indicating whether the certain LDEV 181 configures the primary LU or the secondary LU is set. If the certain LDEV 181 configures the primary LU, "PVOL" is set, while if the certain LDEV 181 configures the secondary LU, "SVOL" is set.

In the partner real serial number 443, a real serial number of the second storage apparatus 10 is set, the second storage apparatus 10 having a LDEV 181 forming a remote pair with the certain LDEV 181.

In the partner real LDEV number 444, a real LDEV number of the LDEV 181 in the second storage apparatus 10 which is forming a remote pair with the certain LDEV 181 is set.

In the partner real port ID 445, a real port ID of the network port 111 for accessing the partner LDEV 181 forming the remote pair with the certain LDEV 181 is set, the network port 111 provided in the second storage apparatus 10 in which the partner LDEV 181 is present.

In the control state 446, information indicating the current control state of the above-described remote pair is set. If the remote pair is in a pair state, "Pair" is set, if in a split state, any one of "Split (PSUS)", "Split (SSWS)", and "Split (PSUE)" is set, and if in a re-sync state, "Re-sync" is set.

Which one is set among the states of "Split (PSUS)", "Split (SSWS)", and "Split (PSUE)" is determined in accordance with the data in the primary LU or the secondary LU configured of the certain LDEV 181.

For example, if the latest data is reflected in only the primary LU, "Split (PSUE)" is set in the control state of the LDEV 181 configuring the primary LU and "Split (PSUE)" is similarly set in the control state of the LDEV 181 configuring the secondary LU. On the other hand, if the latest data is reflected in only the secondary LU, "Split (PSUS)" is set in the control state of the LDEV 181 configuring the primary LU and "Split (SSWS)" is set in the control state of the LDEV 181 configuring the secondary LU.

In the quorum drive ID 447, an identifier (hereinafter, referred to as quorum drive ID) of a quorum drive set for the above-described remote pair is set. Here, the quorum drive is a storage apparatus configured using the LDEVs 181 in the fourth storage apparatus 10 different from the primary apparatus (the first storage apparatus 10) and the secondary apparatus (the second storage apparatus 10). The first storage apparatus 10 and the second storage apparatus 10 manage a quorum drive (the LDEVs 181 with the real LDEV numbers "#80:00" and "#90:00" in FIG. 2) configured using (by mounting) the LDEVs 181 in the fourth storage apparatus 10, in the same manner as the normal LDEVs 181.

In the quorum drive, for example, information (for example, information indicating which data is in the latest state) required to ensure consistency between the data in the primary LU and the data in the secondary LU is managed. For example, when an error occurs in the primary apparatus, the unique information virtualization function switches the path for the primary LU to the path for the secondary LU, and starts accepting (receiving) the data I/O request from the host computer 3. If the switch is performed, for example, before completion of duplication processing for maintaining the pair state between the primary LU and the secondary LU in the remote copy function, the data in the primary LU and the data in the secondary LU may not be the same (correspond). Accordingly, in order to prevent such inconsistency from occurring, information indicating whether or not the duplication processing is completed is managed in a storage apparatus 10 (for example, the fourth storage apparatus 10 shown in FIG. 2) different from the primary apparatus and the secondary apparatus, and update of the secondary LU is suspended until the duplication processing is completed.

In the quorum drive management table 450 shown in FIG. 4, information related to the quorum drive is managed. The quorum drive management table 450 has one or more records each including items of quorum drive ID 451, partner real serial number 452, own virtual serial number 453, and real LDEV number 454.

Among the items, quorum drive IDs are set in the quorum drive ID 451.

In the partner real serial number 452, a real serial number of the second storage apparatus 10 (the partner storage apparatus 10 which accesses the quorum drive) being the partner in the remote copy function is set.

In the own virtual serial number 453, a virtual serial number which the first storage apparatus 10 is showing to the host computer 3 in the unique information virtualization function is set.

In the real LDEV number 454, a real LDEV number of the quorum drive in the first storage apparatus 10 (a LDEV number of the LDEV 181 present in the fourth storage apparatus 10) is set.

In the serial number management table 460 shown in FIG. 4, virtual serial numbers selectable as a virtual serial number which the first storage apparatus 10 shows to the host computer 3 is managed. As shown in FIG. 4, the serial number management table 460 has one or more records each including items of own real serial number 461 and own virtual serial number 462.

Among the items, in own real serial number 461, a real serial number of the first storage apparatus 10 is set. In own virtual serial number 462, a virtual serial number which the first storage apparatus 10 can use is set.

As shown in FIG. 4, in the unique information conversion table 470, a correspondence between the real unique information and the virtual unique information is managed. The first storage apparatus 10 refers to the unique information conversion table 470 as needed when processing related to a data I/O request or an inquiry received from the host computer 3 is performed.

As shown in FIG. 4, the unique information conversion table 470 has one or more records each including items of own real port ID 471, own real LDEV number 472, own real serial number 473, own virtual port ID 474, own virtual LDEV number 475, and own virtual serial number 476. The own real port ID 471, the own real LDEV number 472, and the own real serial number 473 are items in which real unique information is set. The own virtual port ID 474, the own virtual LDEV number 475, and the own virtual serial number 476 are items in which virtual unique information is set.

Among the items, in own real port ID 471, a real port ID of the network port 111 in the first storage apparatus 10 is set. In own real LDEV number 472, a real LDEV number of the LDEV 181 in the first storage apparatus 10 is set. In own real serial number 473, a real serial number of the first storage apparatus 10 is set.

In own virtual port ID 474, a virtual port ID set for the real port ID set in the own real port ID 471 is set. In own virtual LDEV number 475, a virtual LDEV number set for the real LDEV number set in the own real LDEV number 472 is set. In own virtual serial number 476, a virtual serial number set for the real serial number of the first storage apparatus 10 is set.

<Table in Second Storage Apparatus>

FIG. 5 shows various tables managed in the second storage apparatus 10. As shown in FIG. 5, the second storage apparatus 10 manages own virtual port management table 510, partner virtual port management table 520, LU management table 530, remote pair management table 540, quorum drive management table 550, serial number management table 560, and unique information conversion table 570. These tables are stored in the shared memory (the SM 14) in the storage apparatus 10, for example. An operator manipulates the management apparatus 4 to set contents of the tables, for example.

As shown in FIG. 5, the own virtual port management table 510 has one or more records each including items of own real port ID 511, own virtual port ID 512, and enabled/disabled 513.

Among the items, in the own real port ID 511, a real port ID of a certain network port 111 in the second storage apparatus 10 is set. In the own virtual port ID 512, a virtual port ID set for the real port ID is set.

In the enabled/disabled 513, information indicating whether or not the certain network port 111 is currently available is set. If the certain network port 111 is available, "Enabled" is set, while if the certain network port 111 is not available, "Disabled" is set. For example, when an operator has manipulated the management apparatus 4 to disable the certain network port 111, "Disabled" is set in the enabled/disabled 513. Furthermore, when there is an error in the communication function of the first communication network 5 or the second storage apparatus 10, "Disabled" is also set in the enabled/disabled 513.

As shown in FIG. 5, the partner virtual port management table 520 has one or more records each including items of partner serial number 521, partner real port ID 522, partner virtual port ID 523, and enabled/disabled 524.

Among the items, in partner serial number 521, a serial number of the first storage device 10 is set, the first storage device 10 being the primary device which is the partner of this second storage device 10 being the secondary device in the remote copy function.

In partner real port ID 522, a real port ID of a certain network port 111 of the first storage device 10 being the primary device is set. In partner virtual port ID 523, a virtual port ID set for the real port ID is set.

In enabled/disabled 524, information indicating whether or not the certain network port 111 is currently available is set. If the certain network port 111 is available, "Enabled" is set, while if the certain network port 111 is not available, "Disabled" is set. For example, when an operator has manipulated the management apparatus 4 to disable the certain network port 111, "Disabled" is set in enabled/disabled 524. Furthermore, when there is an error in the first communication network 5 or the storage apparatus 10 (the first storage apparatus 10 or the second storage apparatus 10), "Disabled" is also set in enabled/disabled 524.

In LU management table 530 shown in FIG. 5, correspondence between the LUs and the LDEVs 181 (the LDEVs 181 configuring the LUs) in the second storage apparatus 10 is managed. As shown in FIG. 5, LU management table 530 has one or more records each including items of a LUN 531 and an own real LDEV number 532.

Among the items, in LUN 531, a LUN of a LU provided to the host computer 3 is set. In own real LDEV number 532, a real LDEV number of the LDEV 181 in the second storage device 10 configuring the LU is set.

In remote pair management table 540 shown in FIG. 5, correspondence between the LDEV 181 configuring the secondary LU in the secondary apparatus (the second storage apparatus 10) and the LDEV 181 configuring the primary LU in the primary apparatus (the first storage apparatus 10) is managed.

As shown in FIG. 5, remote pair management table 540 has one or more records each including items of own real LDEV number 541, PVOL/SVOL 542, partner real serial number 543, partner real LDEV number 544, partner real port ID 545, control state 546, and quorum drive ID 547.

Among the items, in own real LDEV number 541, a real LDEV number of a certain LDEV 181 in the second storage apparatus 10 is set.

In PVOL/SVOL 542, information indicating whether the certain LDEV 181 configures the primary LU or the secondary LU is set. If the certain LDEV 181 configures the primary LU, "PVOL" is set, while if the certain LDEV 181 configures the secondary LU, "SVOL" is set.

In partner real serial number 543, a real serial number of the first storage apparatus 10 is set, the first storage apparatus 10 having a LDEV 181 forming a remote pair with the certain LDEV 181.

In partner real LDEV number 544, a real LDEV number of the LDEV 181 in the first storage apparatus 10 forming a remote pair with the certain LDEV 181 is set.

In partner real port ID 545, a real port ID of the network port 111 for accessing the partner LDEV 181 forming the remote pair with the certain LDEV 181 is set, the network port 111 provided in the first storage apparatus 10 in which the partner LDEV 181 is present.

In control state 546, information indicating a current control state of the above-described remote pair is set. If the remote pair is in a pair state, "Pair" is set, if in a split state, any one of "Split (PSUS)", "Split (SSWS)" and "Split (PSUE)" is set, and if in a re-sync state, "Re-sync" is set.

In quorum drive ID 547, a quorum drive ID of a quorum drive set for the above-described remote pair is set.

In quorum drive management table 550 shown in FIG. 5, information related to the quorum drive is managed. The quorum drive management table 550 has one or more records each including items of quorum drive ID 551, partner real serial number 552, own virtual serial number 553, and real LDEV number 554.

Among the items, a quorum drive ID is set in quorum drive ID 551.

In partner real serial number 552, a real serial number of the first storage apparatus 10 (the partner storage apparatus 10 which accesses the quorum drive) being the partner in the remote copy function is set.

In own virtual serial number 553, a virtual serial number which the second storage apparatus 10 is showing to the host computer 3 in the unique information virtualization function is set.

In real LDEV number 554, a real LDEV number of the quorum drive in the second storage apparatus 10 (a LDEV number of the LDEV 181 present in the fourth storage apparatus 10) is set.

In serial number management table 560 shown in FIG. 5, virtual serial numbers selectable as a virtual serial number which the second storage apparatus 10 shows to the host computer 3 is managed. As shown in FIG. 5, the serial number management table 560 has one or more records each including items of own real serial number 561 and own virtual serial number 562.

Among the items, in own real serial number 561, a real serial number of the second storage apparatus 10 is set. In own virtual serial number 562, a virtual serial number which the second storage apparatus 10 can use is set. Note that, in the unique information virtualization function, the first storage apparatus 10 and the second storage apparatus 10 select the same virtual serial number from the serial number management table 460 and the serial number management table 560, respectively, to show to the host computer 3.

In the unique information conversion table 570 shown in FIG. 5, correspondence between the real unique information and the virtual unique information is managed. The second storage apparatus 10 refers to the unique information conversion table 570 as needed when processing related to a data I/O request or an inquiry received from the host computer 3 is performed.

As shown in FIG. 5, the unique information conversion table 570 has one or more records each including items of own real port ID 571, own real LDEV number 572, own real serial number 573, own virtual port ID 574, own virtual LDEV number 575, and own virtual serial number 576. The own real port ID 571, the own real LDEV number 572, and the own real serial number 573 are items in which the real unique information is set. The own virtual port ID 574, the own virtual LDEV number 575, and the own virtual serial number 576 are items in which the virtual unique information is set.

Among the items, in the own real port ID 571, a real port ID of the network port 111 in the second storage apparatus 10 is set. In the own real LDEV number 572, a real LDEV number of the LDEV 181 in the second storage apparatus 10 is set. In the own real serial number 573, a real serial number of the second storage apparatus 10 is set.

In own virtual port ID 574, a virtual port ID set for the real port ID set in the own real port ID 571 is set. In own virtual LDEV number 575, a virtual LDEV number set for the real LDEV number set in the own real LDEV number 572 is set. In own virtual serial number 576, a virtual serial number set for the real serial number of the second storage apparatus 10 is set.

=Overview of Processing when Error Occurs=

Next, a description will be given of processing to be performed when an error occurs in the first storage apparatus 10 in the storage system 1 where the unique information virtualization function is achieved.

Figure 7:
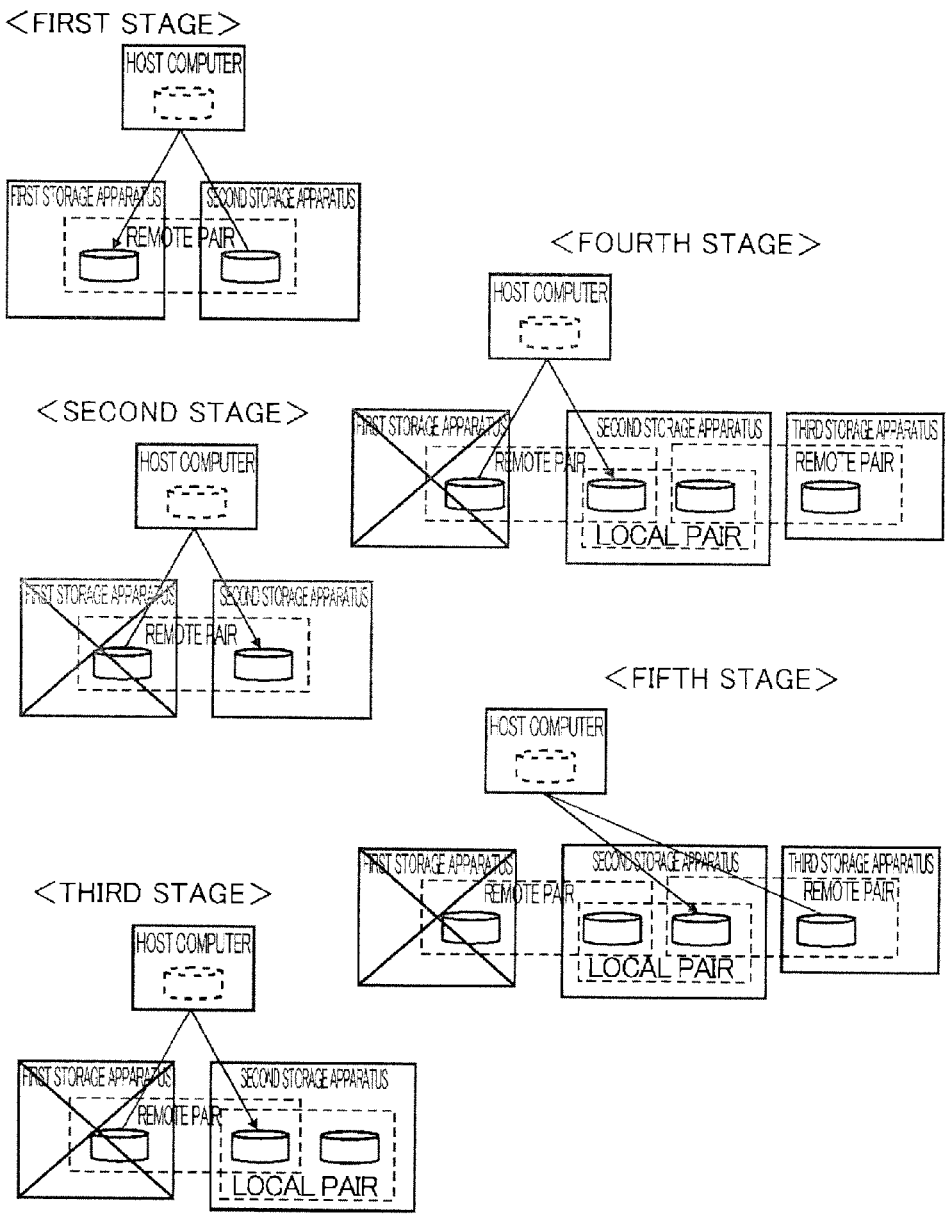
FIG. 7 is a diagram schematically showing the operations of the respective stages in FIG. 6.

FIG. 6 is a diagram explaining an overview of processing performed in the storage system 1 in chronological order when an error occurs in the first storage apparatus 10. Furthermore, FIG. 7 is a diagram schematically showing the operations of the respective stages in FIG. 6. The processing will be described below with reference to the drawings.

<First Stage>

Among the stages shown in FIGS. 6 and 7, the first stage corresponds to a normal operation state before occurrence of an error, where operation of the unique information virtualization function is performed for the first storage apparatus 10 and the second storage apparatus 10. In the first stage, the host computer 3 sends an data I/O request only to the first storage apparatus 10. Furthermore, one or more paths from the host computer 3 to the second storage apparatus 10 are in an available state (online) although not used yet.

Furthermore, in the first stage, a LU in the first storage apparatus 10 and a LU in the second storage apparatus 10 form a remote pair. Thus, when data in the LU in the first storage apparatus 10 is updated, the same data is automatically reflected in the LU in the partner second storage apparatus 10. Accordingly, duplication of data or management of difference information is performed to make the data in the LU in the first storage apparatus 10 and the data in the LU in the second storage apparatus 10 equal to each other. Furthermore, in the first stage, both of the first storage apparatus 10 and the second storage apparatus 10 show the same virtual unique information (the virtual serial number and the virtual LDEV number) to the host computer 3.

Note that, contents set in the path management table 300 shown in FIG. 3 correspond to the first stage. As shown in FIG. 3, in the path management table 300, "1" is set in currently-used flag 318 only for the owner paths which have path IDs "1" and "2" and which lead to LUs with LUNs "0" and "1", respectively. Furthermore, "Online" is set in path state 317 for the non-owner paths which have path IDs "5" and "6" and which lead to LUs with LUNs "0" and "1", respectively.

Therefore, in the state corresponding to this path management table 300, the host computer 3 can see unique information (LDEV numbers "#10:00" and "#10:01" and serial number "FFF0") of the owner paths with the path IDs "1" and "2", and can also see port IDs "1A" and "2A" which lead to LUs with LUNs "0" and "1", respectively. In this manner, in the first stage, the host computer 3 sees as if there is one storage apparatus 10, LUs (the LDEVs 181 configuring the LUs)

which are present in the storage apparatus 10, and a plurality of paths to the LUs, are present.

<Second Stage>

The second stage corresponds to a circumstance where an error occurs in the first storage apparatus 10 and a failover from the first storage apparatus 10 to the second storage apparatus 10 is performed.

Upon detecting an occurrence of an error in the first storage apparatus 10, the host computer 3 switches the path, and starts to send the data I/O request to the second storage apparatus 10 (hereinafter, the second storage apparatus 10 continues to receive the data I/O request from the host computer 3).

Note that, the host computer 3 detects the occurrence of an error in the first storage apparatus 10 on the basis of, for example, an error response for the data I/O request sent to the first storage apparatus 10, timeout of the data I/O request, blockage of a path from the host computer 3 to the first storage apparatus 10, or the like.

The switching of path described above is performed by suspending the use of a currently used path to the first storage apparatus 10, and by starting to use a path seen by the host computer 3 in the first stage that leads to the second storage apparatus 10.

In the second stage, the second storage apparatus 10 shows to the host computer 3 the same virtual unique information as the virtual unique information which the first storage apparatus 10 has showed to the host computer 3. Note that, the redundant management for the remote pair is no longer performed because an error has occurred in the first storage apparatus 10 being the primary apparatus.

To be specific, for example, in a case where the first stage is in the state of the path management table 300 shown in FIG. 3, the following setting is performed when an error occurs in the first storage apparatus 10. As shown in FIG. 8, "Offline" is set in path state 317 and "0" is set in the currently-used flag 318 for each of the owner paths with path IDs "1" and "2", and "1" is set in the currently-used flag 318 for the non-owner paths with path IDs "5" and "6". Therefore, the host computer 3 can see port ID "2A" leading to each of the LUs with LUNs "0" and "1". Furthermore, the host computer 3 can also see virtual unique information (LDEV numbers "#10:00" and "#10:01" and serial number "FFF0") of the non-owner paths with path IDs "5" and "6".

FIG. 9 shows an example of the remote pair management table 540 in the second storage apparatus 10 after the path is switched and the reception of a data I/O request sent from the host computer 3 is started.

As shown in FIG. 9, "Split (SSWS)" is set in the control state 546 for each of secondary LUs in the second storage apparatus 10. Note that, "SSWS" in parentheses indicates that the secondary LU is subjected to an update which is not reflected in the primary LU, as described above.

Note that, after the failover is performed, the second storage apparatus 10 shows to the host computer 3 the same virtual unique information as the virtual unique information which the first storage apparatus 10 has showed to the host computer 3. Accordingly, the host computer 3 does not have to change settings of the unique information when a path is switched.

<Third Stage>

In the third stage, in order to resume the redundant management for the remote pair of the second storage apparatus 10 as the primary apparatus and the third storage apparatus 10 as the secondary apparatus, the second storage apparatus 10 starts duplication of data to a LU newly set as a primary LU (hereinafter, referred to as new primary LU) while using, as a source, the secondary LU (hereinafter, referred to as old secondary LU) of the remote pair stopped being used in the redundant management. This duplication is performed by using the local copy function. Details of the third stage will be described later.

<Fourth Stage>

In the fourth stage, in order to form a new remote pair (hereinafter, referred to as new remote pair) of the new primary LU in the second storage apparatus 10 and a new secondary LU (hereinafter, referred to as new secondary LU) in the third storage apparatus 10, the second storage apparatus 10 and the third storage apparatus 10 each perform necessary settings of the tables and start duplication of data from the new primary LU to the new secondary LU. Note that, this duplication is performed using the remote copy function. Details of the fourth stage will be described later.

<Fifth Stage>

At the fifth stage, after duplication of data from the old secondary LU to the new primary LU by the local copy function is completed, a path from the host computer 3 to the third storage apparatus 10 is set, and operation of the unique information virtualization function for the new remote pair is started. Details of the fifth stage will be described later.

=Detailed Explanations=

<Details of Third Stage>

Figure 10:
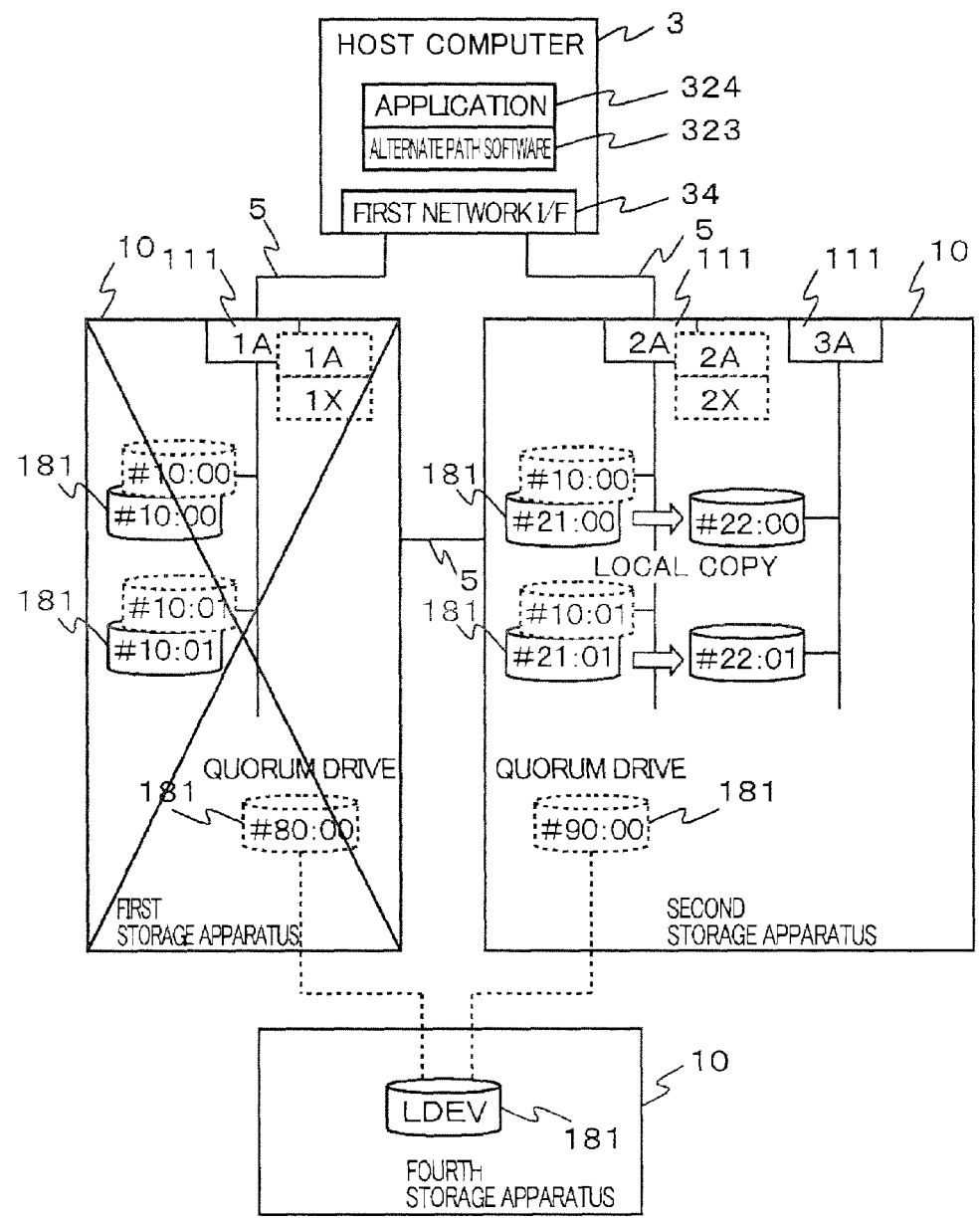
FIG. 10 is a diagram for explaining a third stage.

FIG. 10 is a diagram for explaining the third stage, and is a diagram showing a state where the second storage apparatus 10 uses the local copy function to perform duplication of data to the new primary LU while using, as a source, the secondary LU of the remote pair stopped being used in the redundant management.

In this example, data of the LDEV 181 which has configured the old secondary LU and which has the real LDEV number "#21:00" is duplicated to the LDEV 181 which configures the new primary LU, which is coupled to the network port 111 with a real port ID "3A", and which has a real LDEV number "#22:00". Similarly data of the LDEV 181 which has configured the old secondary LU and which has the real LDEV number "#21:01" is duplicated to the LDEV 181 which configures the new primary LU, which is coupled to the network port 111 of the real port ID "3A", and which has a real LDEV number "#22:01".

Figure 11:
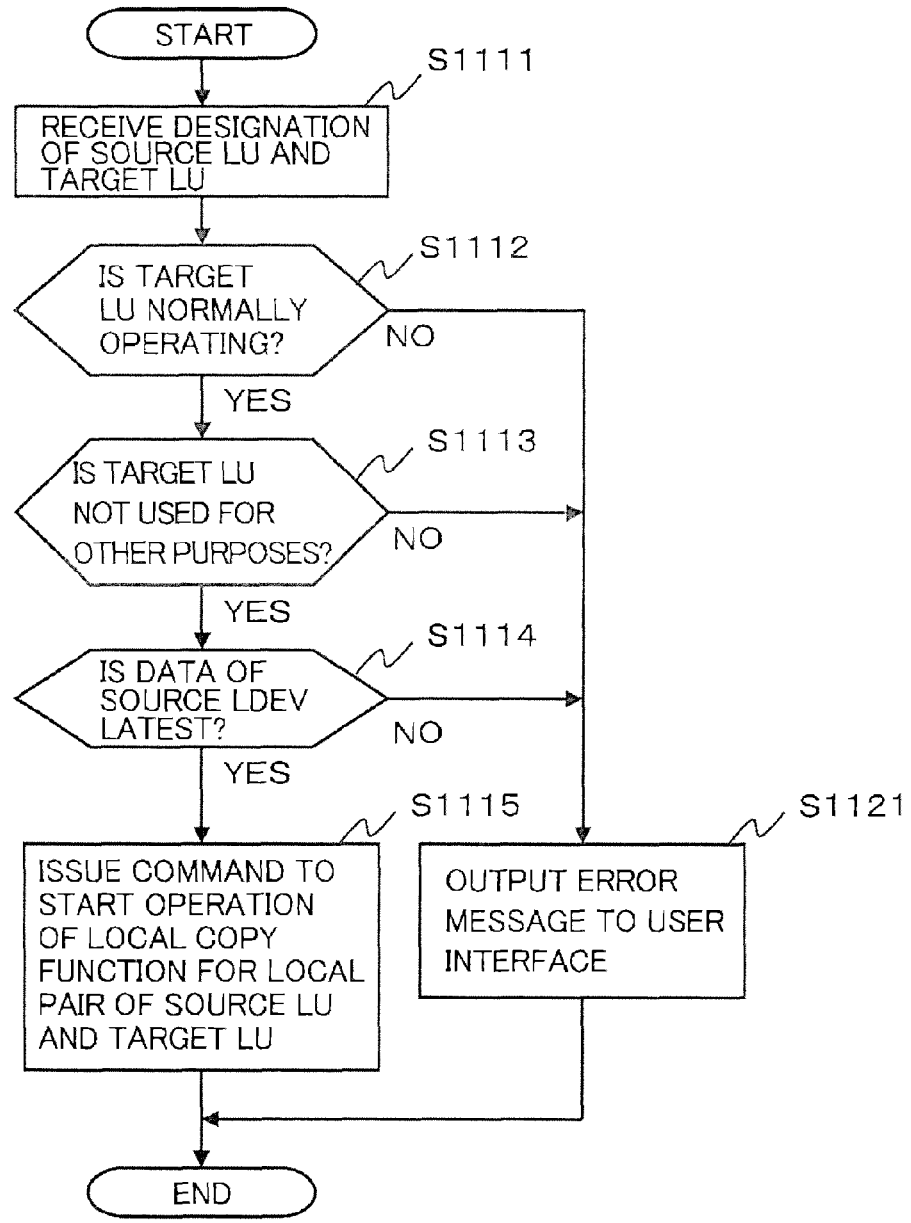
FIG. 11 is a flowchart for explaining local copy start command processing S1100.

FIG. 11 is a flowchart for explaining processing (hereinafter, referred to as local copy start command processing S100) mainly performed by the management apparatus 4 when duplication using the local copy function is started. Note that, in the local copy start command processing S1100, the management apparatus 4 accesses the various tables stored in the shared memory (the SM 14) in the second storage apparatus 10 as needed via the second communication network 6.

As shown in FIG. 11, firstly, the management apparatus 4 receives, from a user, designation of a source LU and a target LU (or the LDEVs 181 configuring these LUs) (S1111).

Next, the management apparatus 4 judges whether or not the target LU (the LDEV 181 configuring the target LU) is normally operating (for example, whether or not the target LU has an error in functions such as write and read) (S1112). This judgment is made, for example, based on the error information managed in the shared memory (the SM 14) in the second storage apparatus 10. If the target LU is normally operating (S1112: YES), the processing proceeds to S1113, while if the target LU is not normally operating (S1112: NO), the processing proceeds to S1121.

In S1113, the management apparatus 4 judges whether or not the target LU is already used for other purposes (for example, local copy function, remote copy function, and the like). This judgment is made, for example, based on the information managed in the shared memory (the SM 14) in the second storage apparatus 10. If the target LU is not used for other purposes (S1113: YES), the processing proceeds to S1114, while if the target LU is already used for other purposes (S1113: NO), the processing proceeds to S1121.

In S1114, the management apparatus 4 judges whether or not data in the source LDEV 181 is in the latest state. This judgment is made, for example, by referring to the contents of the control state 546 of the remote pair management table 540 managed in the shared memory (the SM 14) in the second storage apparatus 10. Specifically, if "Pair" or "Split (SSWS)" is set in the control state 546, the management apparatus 4 judges that the data in the source LDEV 181 is in the latest state. If the data in the source LDEV 181 is in the latest state (S1114: YES), the processing proceeds to S1115, while if the data is not in the latest state (S1114: NO), the processing proceeds to S1121.

In S1115, the management apparatus 4 sends the second storage apparatus 10 a command to start the operation of the local copy function for the local pair of the source LU and the target LU accepted in S1111. Meanwhile, in S1121, the management apparatus 4 outputs an error message to the UI 46 in the management apparatus 4.

Figures 12, 13:
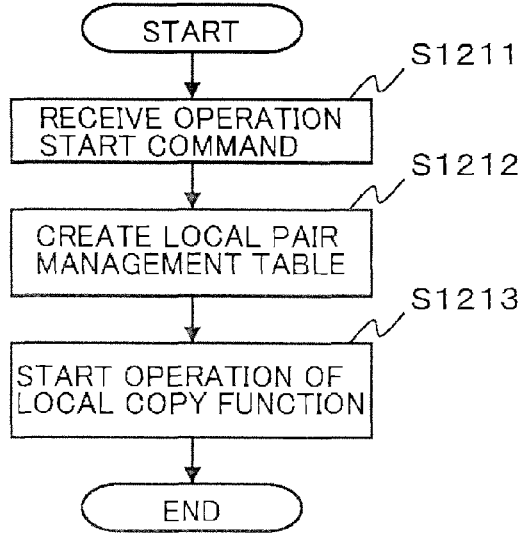
FIG. 12 is a flowchart for explaining local copy start processing S1200.
FIG. 13 shows an example of a local pair management table 1300.

FIG. 12 is a flowchart for explaining processing (hereinafter, referred to as local copy start processing S1200) performed in the second storage apparatus 10 when the management apparatus 4 sends a command to start operation of the local copy function. The processing will be described below with reference to FIG. 12.

Upon receiving the command from the management apparatus 4 (S1211), the second storage apparatus 10 creates a table (hereinafter, referred to as local pair management table 1300) to be used in the operation of the local copy function, and stores the table in the shared memory (the SM 14) (S1212).

FIG. 13 shows an example of the local pair management table 1300. As shown in FIG. 13, the local pair management table 1300 has one or more records each including items of own real LDEV number 1311, source/target 1312, partner real LDEV number 1313, and control state 1314.

Among the items, in the own real LDEV number 1311, a real LDEV number of a certain LDEV 181 in the second storage apparatus 10 is set.

In source/target 1312, information indicating whether the certain LDEV 181 configures the source LU or the target LU in the local copy function is set. If the certain LDEV 181 configures the source LU, "Source" is set, while if the certain LDEV 181 configures the target LU, "Target" is set.

In partner real LDEV number 1313, a real LDEV number of a LDEV 181 in the second storage apparatus 10 forming a local pair with the certain LDEV 181 is set.

In control state 1314, information indicating a current control state of the local pair is set. If the local pair is in a pair state, "Pair" is set, if in a split state, "Split" is set, and if in a re-sync state, "Re-sync" is set.

Referring back to FIG. 12, next, the second storage apparatus 10 starts the operation of the local copy function for the local pair of the source LU and the target LU, after having created the local pair management table 1300 (S1213). After the operation is started, duplication of data and management of difference information is performed between the source LU and the target LU to make the data in the source LU and the data in the target LU equal to each other.

<Details of Fourth Stage>

Figure 14:
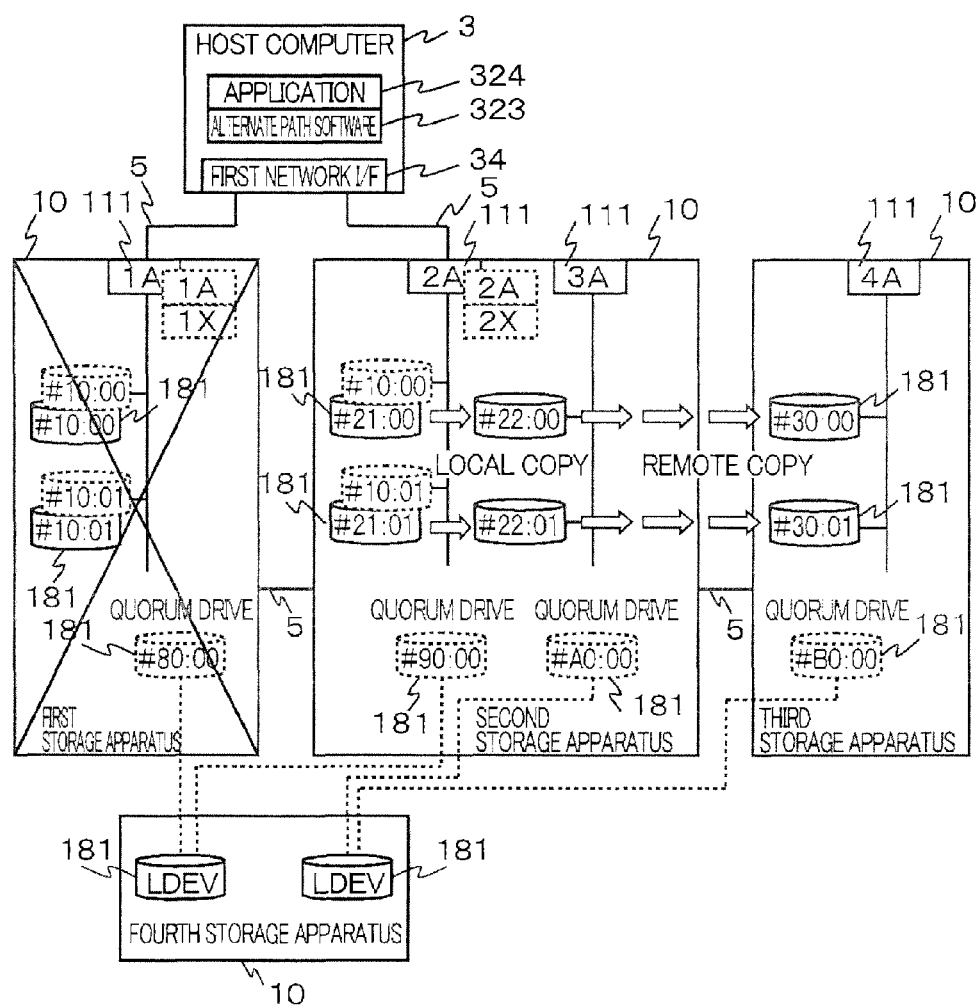
FIG. 14 is a diagram for explaining a fourth stage.

FIG. 14 is a diagram for explaining the fourth stage, and is a diagram showing a state where the new primary LU in the second storage apparatus 10 and the new secondary LU in the third storage apparatus 10 form a new remote pair, and duplication of data from the new primary LU to the new secondary LU is performed by using the remote copy function.

In this example, data of the LDEV 181 which configures the new primary LU in the second storage apparatus 10 and which has the real LDEV number "#22:00" is duplicated to the LDEV 181 which configures the new secondary LU, which is coupled to the network port 111 with real port ID "4A" in the third storage apparatus 10, and which has a real LDEV number "#30:00". Similarly data of the LDEV 181 which configures the new primary LU and which has the real LDEV number "#22:01" is duplicated to the LDEV 181 which configures the new secondary LU, which is coupled to the network port 111 with the real port ID "4A" in the third storage apparatus 10, and which has a real LDEV number "#30:01".

Furthermore, as shown in FIG. 14, the second storage apparatus 10 is provided with a quorum drive (the LDEV 181 with a real LDEV number "#A0:00") based on the LDEV 181 in the fourth storage apparatus 10, as a quorum drive to ensure consistency between data in the new primary LU and data in the new secondary LU. Furthermore, the third storage apparatus 10 is provided with a quorum drive (LDEV 181 with a real LDEV number "#B0:00") based on the LDEV 181 in the fourth storage apparatus 10.

FIG. 15 shows the quorum drive management table 550 in the second storage apparatus 10 and the quorum drive management table 650 in the third storage apparatus 10, after information related to the quorum drives is added. Note that, the quorum drive management table 650 in the third storage apparatus 10 is stored in the shared memory (the SM 14) in the third storage apparatus 10.

As shown in FIG. 15, to the quorum drive management table 550 in the second storage apparatus 10 a records is added where the items are set as follows: "E" is set in the quorum drive ID 551; "3333", which is a real serial number of the third storage apparatus 10, is set in the partner real serial number 552; "FFF0", which is the virtual serial number shown to the host computer 3, is set in the own virtual serial number 553; and "A0:00", which is the real LDEV number of the quorum drive, is set in the real LDEV number 554.

Furthermore, in the quorum drive management table 650 in the third storage apparatus 10, a record is registered where the items are set as follows: "E" is set in quorum drive ID 651; "2222", which is the real serial number of the second storage apparatus 10, is set in partner real serial number 652; "FFF0", which is the virtual serial number shown to the host computer 3 by the third storage apparatus 10, is set in own virtual serial number 653; and "B0:00", which is the real LDEV number of the quorum drive, is set in real LDEV number 654.

Figure 16:
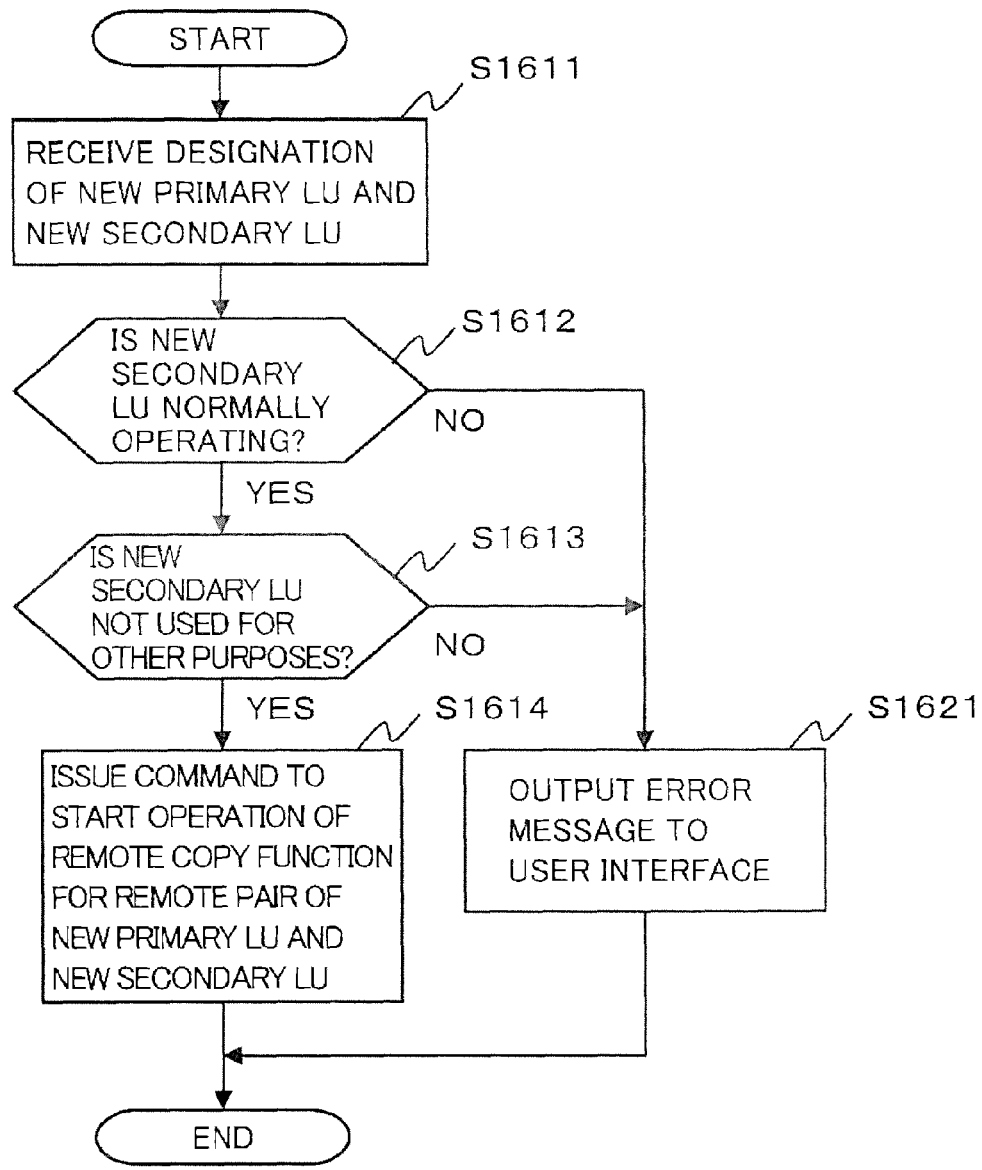
FIG. 16 is a flowchart for explaining remote copy start command processing S1600.

FIG. 16 is a flowchart for explaining processing (hereinafter, referred to as remote copy start command processing S1600) mainly performed by the management apparatus 4 when data is duplicated from the new primary LU to the new secondary LU by using the remote copy function. Note that, in the remote copy start command processing S1600, the management apparatus 4 accesses the various tables stored in the shared memory (SM 14) in the second storage apparatus 10 and the third storage apparatus 10 via the second communication network 6 as needed.

As shown in FIG. 16, firstly, the management apparatus 4 receives, from a user, designation of a new primary LU and a new secondary LU (or the LDEVs 181 configuring these LUs) (S1611).

Next, the management apparatus 4 judges whether or not the new secondary LU (the LDEV 181 configuring the new secondary LU) is normally operating (for example, whether or not the new secondary LU has an error in functions such as write and read) (S1612). This judgment is made, for example, based on the error information managed in the shared memory (the SM 14) in the third storage apparatus 10. If the new secondary LU is normally operating (S1612: YES), the processing proceeds to S1613, while if the new secondary LU is not normally operating (S1612: NO), the processing proceeds to S1621.

In S1613, the management apparatus 4 judges whether or not the new secondary LU (the LDEV 181 configuring the secondary LU) is already used for other purposes (for example, the local copy function, the remote copy function, and the like). This judgment is made, for example, based on information managed in the shared memory (the SM 14) in the third storage apparatus 10. If the new secondary LU is not used for other purposes (S1613: YES), the processing proceeds to S1614, while if the new secondary LU is already used for other purposes (S1613: NO), the processing proceeds to S1621.

In S1614, the management apparatus 4 sends a command to start the operation of the remote copy function for the remote pair of the new primary LU and the new secondary LU accepted in S1611. Meanwhile, in S1621, the management apparatus 4 outputs an error message to the UI 46 in the management apparatus 4.

For example, in the above command, the management apparatus 4, sets as the new primary LU of the remote pair, network port 111 with real port ID "3A" and LDEV 181 with LDEV number "#22:00", sets as the new secondary LU, network port 111 with real port ID "4A" and LDEV 181 with LDEV number "#30:00", and sets the quorum drive with quorum ID "E" for the remote pair.

Similarly, in the above command, the management apparatus 4, sets as the new primary LU of the remote pair, network port 111 with real port ID "3A" and LDEV181 with LDEV number "#22:01", sets as the new secondary LU of the remote pair, network port 111 with real port ID "4A" and LDEV181 with LDEV number "#30:01", and sets the quorum drive with quorum ID "E" for the remote pair.

Figure 17:
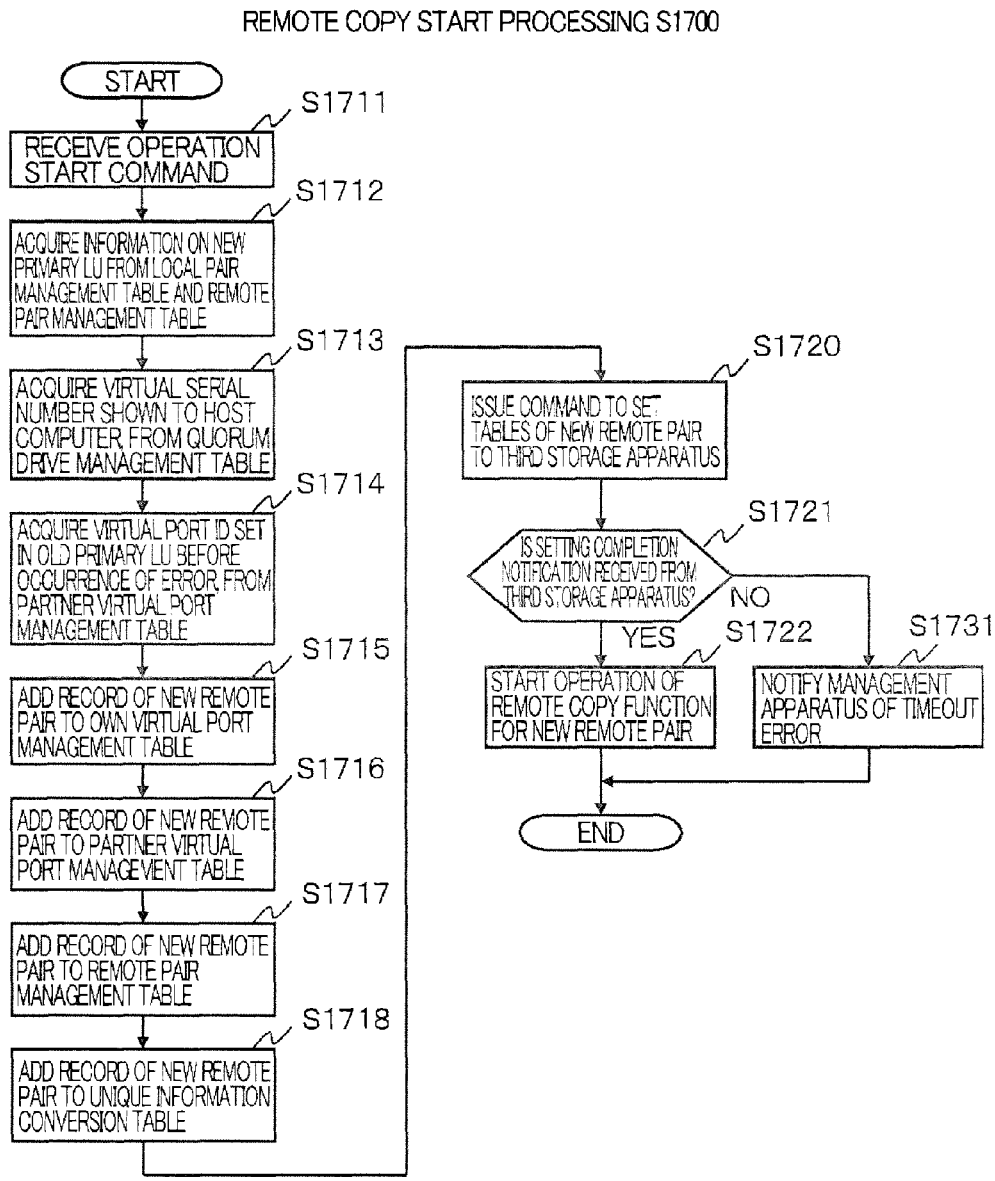
FIG. 17 is a flowchart for explaining remote copy start processing S1700.

FIG. 17 is a flowchart for explaining processing (hereinafter, referred to as remote copy start processing S1700) performed in the second storage apparatus 10 when the management apparatus 4 sends a command to start the operation of the remote copy function.

As shown in FIG. 17, upon receiving the command from the management apparatus 4 (S1711), the second storage apparatus 10 acquires information related to the new primary LU specified in the command, from the local pair management table 1300 and the remote pair management table 540 (S1712). Then, the second storage apparatus 10 compares the acquired information and the quorum drive management table 550, and acquires a virtual serial number which the second storage apparatus 10 is currently showing to the host computer 3 (S1713).

For example, when the tables in the second storage apparatus 10 have the contents shown in FIG. 5, the second storage apparatus 10, acquires from the local pair management table 1300 real LDEV numbers "#21:00" and "21:01" of the source of the local pair on the basis of LDEV numbers "#22:00" and "#22:01" of the new primary LU designated (set) by the management apparatus 4. Then, the second storage apparatus 10 acquires "F", which is a quorum drive ID corresponding to the real LDEV numbers, from the remote pair management table 540 (S1712). Subsequently, the second storage apparatus 10 acquires "FFF0" as a virtual serial number (a content of the own virtual serial number 553) corresponding to the acquired quorum drive ID "F", from the quorum drive management table 550 (S1713).

Next, the second storage apparatus 10 acquires, from the partner virtual port management table 520, the virtual port ID set for the network port 111 to which a primary LU (hereinafter, referred to as old primary LU) of a remote pair (hereinafter, referred to as old remote pair) formed before occurrence of the error in the first storage apparatus 10 is coupled (S1714).

For example, when the tables in the second storage apparatus 10 have the contents shown in FIG. 5, the second storage apparatus 10 acquires "1A" and "1X" set in the partner virtual port ID 523 of the partner virtual port management table 520 (S1714).

Next, the second storage apparatus 10 adds a record related to the new remote pair to the own virtual port management table 510 (S1715). FIG. 18 shows a state where a record related to the new remote pair is added to the own virtual port management table 510 when the own virtual port management table 510 in the second storage apparatus 10 has the contents shown in FIG. 5. As shown in FIG. 18, a record in which "3A" is set in the own real port ID 511, "1X" is set in the own virtual port ID 512, and "Enabled" is set in the enabled/disabled 513 is added to the own virtual port management table 510 as a record related to the new remote pair. Note that, the setting contents of the record are notified as needed, for example, from the management apparatus 4 or the third storage apparatus 10 to the second storage apparatus 10.

Next, the second storage apparatus 10 adds a record related to the new remote pair to the partner virtual port management table 520 (S1716). FIG. 18 shows a state where a record related to the new remote pair is added to the partner virtual port management table 520 when the partner virtual port management table 520 in the second storage apparatus 10 has the contents shown in FIG. 5. As shown in FIG. 18, a record with "3333" set in the partner real serial number 521, "4A" set in the partner real port ID 522, "2X" set in the partner virtual port ID 523, and "Enabled" set in the enabled/disabled 524 is added to the partner virtual port management table 520 as a record related to the new remote pair. Note that, the setting contents of the record are notified as needed, for example, from the management apparatus 4 or the third storage apparatus 10 to the second storage apparatus 10.

Next, the second storage apparatus 10 adds a record related to the new remote pair to the remote pair management table 540 (S1717). FIG. 19 shows a state where a record related to the new remote pair is added to the remote pair management table 540 when the remote pair management table 540 in the second storage apparatus 10 has the contents shown in FIG. 5. As shown in FIG. 19, a record with "#22:00" set in the own real LDEV number 541, "PVOL" set in the PVOL/SVOL 542, "3333" set in the partner real serial number 543, "#30:00" set in the partner real LDEV number 544, "4A" set in the partner real port ID 545, "Pair" set in the control state 546, and "E" set in the quorum drive ID 547 is added to the remote pair management table 540 as a record related to the new remote pair.

Moreover, a record with "#22:01" set in the own real LDEV number 541, "PVOL" set in the PVOL/SVOL 542, "3333" set in the partner real serial number 543, "#30:01" set in the partner real LDEV number 544, "4A" set in the partner real port ID 545, "Pair" set in the control state 546, and "E" set in the quorum drive ID 547 is added to the remote pair management table 540 as a record related to the new remote pair. Note that, the setting contents of the record are notified as needed, for example, from the management apparatus 4 or the third storage apparatus 10 to the second storage apparatus 10.

Next, the second storage apparatus 10 adds a record related to the new remote pair to the unique information conversion table 570 (S1718). FIG. 19 shows a state where a record related to the new remote pair is added to the unique information conversion table 570 when the unique information conversion table 570 in the second storage apparatus 10 has the contents shown in FIG. 5. As shown in FIG. 19, a record with "3A" set in the own real port ID 571, "#22:00" set in the own real LDEV number 572, "2222" set in the own real serial number 573, "1X" set in the own virtual port ID 574, "#10:00" set in the own virtual LDEV number 575, and "FFF0" set in the own virtual serial number 576 is added to the unique information conversion table 570 as a record related to the new remote pair.

Moreover, a record with "3A" set in the own real port ID 571, "#22:01" set in the own real LDEV number 572, "2222" set in the own real serial number 573, "1X" set in the own virtual port ID 574, "#10:01" set in the own virtual LDEV number 575, and "FFF0" set in the own virtual serial number 576 is added to the unique information conversion table 570 as a record related to the new remote pair. Note that, the setting contents of the records are notified as needed, for example, from the management apparatus 4 or the third storage apparatus 10 to the second storage apparatus 10.

Next, the second storage apparatus 10 sends to the third storage apparatus 10 a setting command for the tables related to the new remote pair (S1720), and waits to receive setting completion notification of the tables which is sent from the third storage apparatus 10 (S1721). Subsequently, upon receiving the setting completion notification from the third storage apparatus 10 (S1721: YES), the second storage apparatus 10 starts the operation of the remote copy function for the new remote pair (S1722). Note that, if the setting completion notification cannot be received within a predetermined period of time from the third storage apparatus 10 (S1721: NO), the second storage apparatus 10 notifies the management apparatus 4 of a timeout error (S1731).

Figure 20:
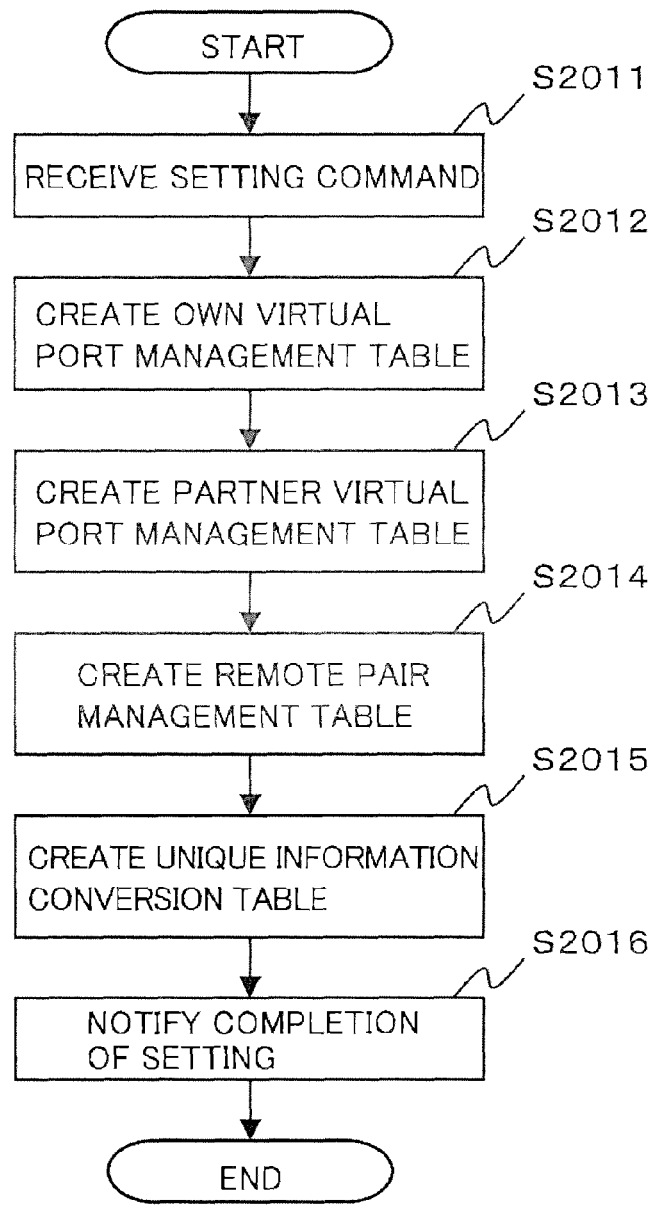
FIG. 20 is a flowchart for explaining remote copy start preparation processing S2000.

FIG. 20 is a flowchart for explaining processing (hereinafter, referred to as remote copy start preparation processing S2000) performed by the third storage apparatus 10 when the second storage apparatus 10 sends the setting command for the tables related to the new remote pair. The processing will be described below with reference to FIG. 20.

Upon receiving the command from the management apparatus 4 (S2011), the third storage apparatus 10 creates an own virtual port management table 610 shown in FIG. 21, to which a record related to the new remote pair is registered (S2012). As shown in FIG. 21, a record with "4A" set in own real port ID 611, "2X" set in own virtual port ID 612, and "Enabled" to enabled/disabled 613 is registered to the own virtual port management table 610 as a record related to the new remote pair. Note that, the setting contents of the record are notified as needed, for example, from the management apparatus 4 or the second storage apparatus 10 to the third storage apparatus 10.

Next, the third storage apparatus 10 creates a partner virtual port management table 620 shown in FIG. 21, to which a record related to the new remote pair is registered (S2013). As shown in FIG. 21, a record with "2222" set in the partner real serial number 621, "3A" set in the partner real port ID 622, "1X" set in the partner virtual port ID 623, and "Enabled" set in the enabled/disabled 624 is registered to the partner virtual port management table 620 as a record related to the new remote pair. Note that, the setting contents of the record are notified as needed, for example, from the management apparatus 4 or the second storage apparatus 10 to the third storage apparatus 10.

Next, the third storage apparatus 10 creates a remote pair management table 640 shown in FIG. 21, to which a record related to the new remote pair is registered (S2014). As shown in FIG. 21, a record with "#30:00" set in a own real LDEV number 641, "SVOL" set in a PVOL/SVOL 642, "2222" set in a partner real serial number 643, "#22:00" set in a partner real LDEV number 644, "3A" set in an partner real port ID 645, "Pair" set in a control state 646, and "E" set in a quorum drive ID 647 is registered to the remote pair management table 640 as a record related to the new remote pair.

Moreover, a record with "#30:01" set in the own real LDEV number 641, "SVOL" set in the PVOL/SVOL 642, "2222" set in the partner real serial number 643, "#22:01" set in the partner real LDEV number 644, "3A" set in the partner real port ID 645, "Pair" set in the control state 646, and "E" set in the quorum drive ID 647 is registered as a record related to the new remote pair. Note that, the setting contents of the records are notified as needed, for example, from the management apparatus 4 or the second storage apparatus 10 to the third storage apparatus 10.

Next, the third storage apparatus 10 creates a unique information conversion table 670 shown in FIG. 21, to which a record related to the new remote pair is registered (S2015). As shown in FIG. 21, a record with "4A" set in own real port ID 671, "#30:00" set in own real LDEV number 672, "3333" set in own real serial number 673, "2X" set in own virtual port ID 674, "#10:00" set in own virtual LDEV number 675, and "FFF0" set in own virtual serial number 676 is registered to the unique information conversion table 670 as a record related to the new remote pair.

Moreover, a record with "4A" set in the own real port ID 671, "#30:01" set in the own real LDEV number 672, "3333" set in the own real serial number 673, "2X" set in the own virtual port ID 674, "#10:01" set in the own virtual LDEV number 675, and "FFF0" set in the own virtual serial number 676 is registered as a record related to the new remote pair. Note that, the setting contents of the records are notified as needed, for example, from the management apparatus 4 or the second storage apparatus 10 to the third storage apparatus 10.

Referring back to FIG. 20, when the creation of the tables described above is completed, the third storage apparatus 10 sends the second storage apparatus 10 notification notifying that setting of the tables related to the new remote pair is completed (S2016).

<Details of Fifth Stage>

Figure 22:
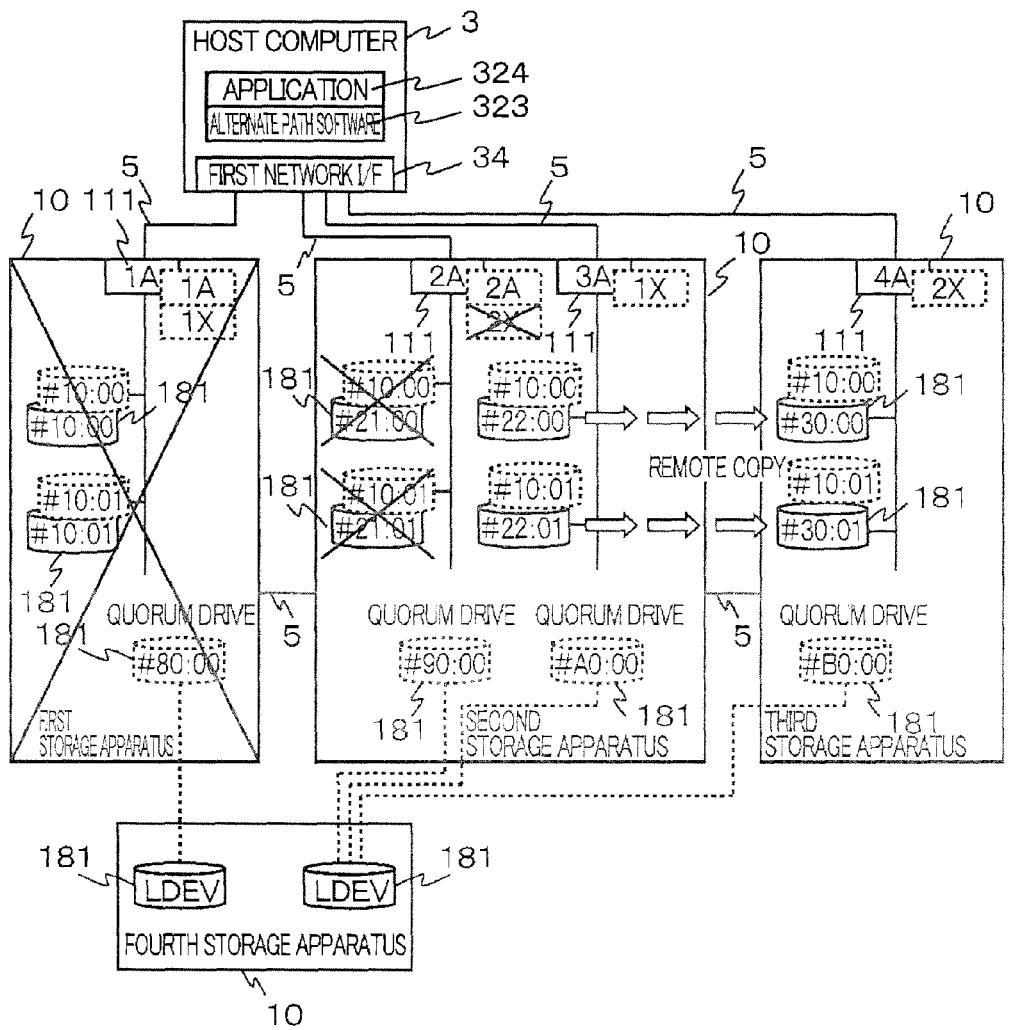
FIG. 22 is a diagram for explaining a fifth stage.

FIG. 22 is a diagram for explaining the fifth stage, and is a diagram showing a state where operation of the unique information virtualization function is started, the unique information virtualization function for the new remote pair formed of the new primary LU in the second storage apparatus 10 and the new secondary LU in the third storage apparatus 10.

As shown in FIG. 22, when the operation of the unique information virtualization function for the new remote pair is started, paths are set from the host computer 3 in way that: the network port 111 (the network port 111 with real port ID "3A" and virtual port ID "1X") coupled to the new primary LU (the LDEVs 181 with respective real LDEV numbers "#22:00" and "#22:01") in the second storage apparatus 10 is coupled to the host computer 3; and that the network port 111 (the network port 111 with real port ID "4A" and virtual port ID "2X") coupled to the new secondary LU (the LDEVs 181 with respective real LDEV numbers "#30:00" and "#30:01") in the third storage apparatus 10 is coupled to the host computer 3. Note that, at the time when the paths are set, the network port 111 with real port ID "2A" continues to receive an data I/O request from the host computer 3. Therefore, in the second storage apparatus 10, both of the old secondary LU and the new primary LU are capable of being updated by the data I/O request sent from the host computer 3.

In the unique information conversion table 570 in the second storage apparatus 10, a virtual LDEV number same as the virtual LDEV number set for the LDEVs 181 (the LDEVs 181 with respective real LDEV numbers "#10:00" and "#10:01") having configured the old primary LU is set for the LDEVs 181 (the LDEVs 181 with respective real LDEV numbers "#22:00" and "#22:01") configuring the new primary LU. Furthermore, virtual port ID "1X", which is set for the network port 111 coupled to the old primary LU, is set for the network port 111 with real port ID "3A".

Accordingly, by setting the paths in the above-described way, the host computer 3 sees as if a plurality of paths (path (second path) including the network port 111 with real port ID "2A", a path (hereinafter, referred to as third path) including the network port 111 with real port ID "3A", and a path (hereinafter, referred to as fourth path) including the network port 111 with real port ID "4A") exist for each of the LDEVs 181 with the LDEV numbers "#10:00" and "#10:01".

After the paths are set, the second storage apparatus 10 monitors whether or not the new primary LU is updated by the data I/O request received via the network port 111 with real port ID "3A". When detecting that the new primary LU has been updated, the second storage apparatus 10 inhibits an access from the host computer 3 to the old secondary LU (closes the old secondary LU). When the new primary LU is updated in this way, the old secondary LU is closed to prevent the host computer 3 from accessing old data.

FIG. 23 shows a state of the path management table 300 managed by the host computer 3 after the paths are set in the way described above. As shown in FIG. 23, each of the paths including the network ports 111 with port IDs "1X", "2A", and "2X", respectively (paths (third path) with respective path IDs "3" and "4", paths (second path) with respective path IDs "5" and "6", and paths (fourth path) with respective path IDs "7" and "8") is seen to be in an online state from the host computer 3. Furthermore, because the network port 111 with port ID "1X" is an owner path, this network port 111 is preferentially used and "1" is set in the currently-used flag 318 of this network port 111.

Figure 24:
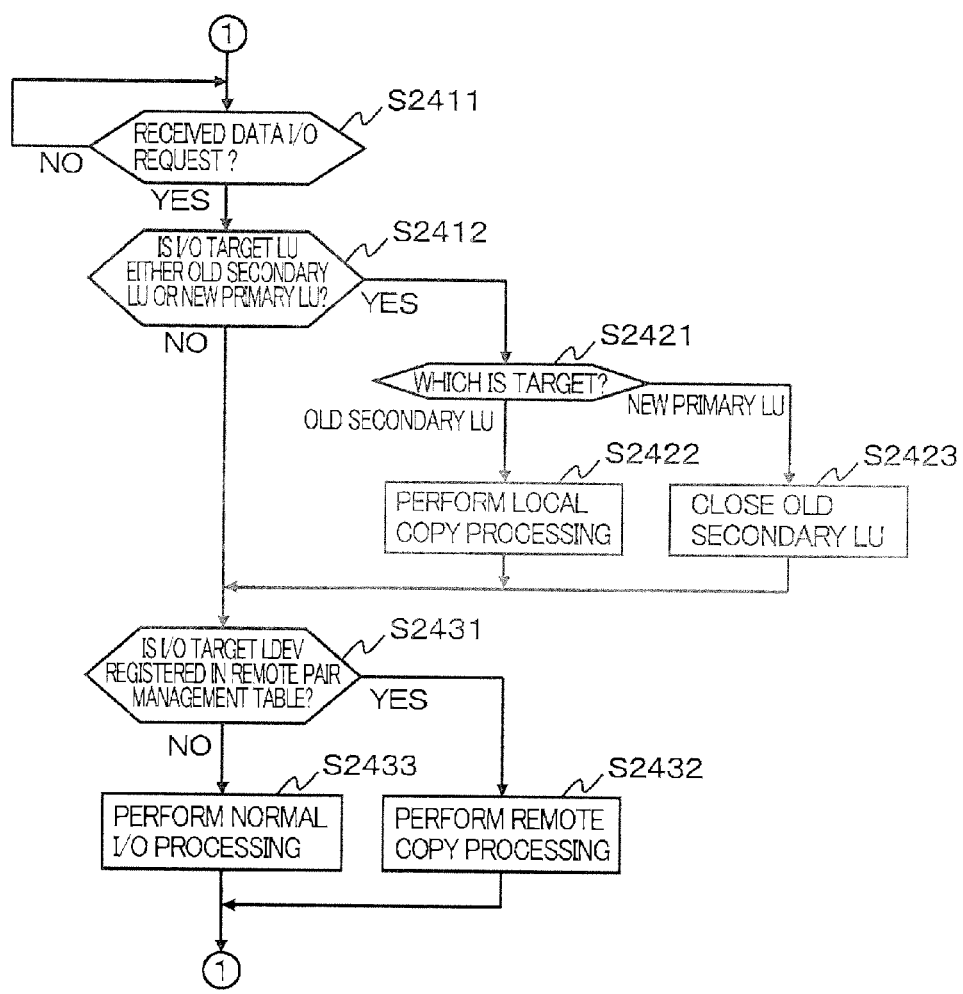
FIG. 24 is a flow chart for explaining data I/O processing (second storage apparatus) S2400.

FIG. 24 is a flowchart for explaining processing (hereinafter, referred to as data I/O processing (second storage apparatus) S2400) performed in the second storage apparatus 10 when the second storage apparatus 10 receives the data I/O request from the host computer 3 after the paths are set in the way described above.

As shown in FIG. 24, upon receiving the data I/O request sent from the host computer 3 (S2411: YES), the second storage apparatus 10 refers to the local pair management table 1300, and judges whether or not a LU (hereinafter, referred to as I/O target LU) being a target of the data I/O request is any one of the old secondary LU and the new primary LU (in other words, judges whether or not the LDEV 181 (hereinafter, referred to as I/O target LDEV) configuring the I/O target LU is registered in the local pair management table 1300) (S2412). If the I/O target LU is any one of the old secondary LU and the new primary LU (S2412: YES), the processing proceeds to S2421, while if the I/O target LU is neither the old secondary LU nor the new primary LU (S2412: NO), the processing proceeds to S2431.

In S2421, the second storage apparatus 10 refers to the local pair management table 1300 and the remote pair management table 540, and judges whether the LU being the target of the data I/O request is the old secondary LU (a source of the local pair) or the new primary LU (a target of the local pair). If the I/O target LU is the old secondary LU (S2421: old secondary LU), the processing proceeds to S2422, while if the I/O target LU is the new primary LU (S2421: new primary LU), the processing proceeds to S2423.

In S2422, the second storage apparatus 10 executes normal I/O processing on the old secondary LU. In addition, the second storage apparatus 10 reflects (duplicates) the update difference of the old secondary LU in the new primary LU by using the local copy function in order to ensure consistency between the local pair. Then, the processing proceeds to S2431.

In S2423, the second storage apparatus 10 executes normal I/O processing on the new primary LU, and closes the old secondary LU. Then, processing proceeds to S2431.

In S2431, the second storage apparatus 10 refers to the remote pair management table 540, and judges whether the LU being the target of the data I/O request is the new primary LU. If the I/O target LU is the new primary LU (S2431: YES), processing proceeds to S2432, while if the I/O target LU is not the new primary LU (S2431: NO), processing proceeds to S2433.

In S2432, the second storage apparatus 10 executes normal I/O processing on the new primary LU. In addition, the second storage apparatus 10 reflects (duplicates) the updated data of the new primary LU in the new secondary LU by using the remote copy function in order to ensure consistency between the remote pair.

In S2433, the second storage apparatus 10 executes normal I/O processing on the I/O target LU. Then, the processing returns to S2411.

Figure 25:
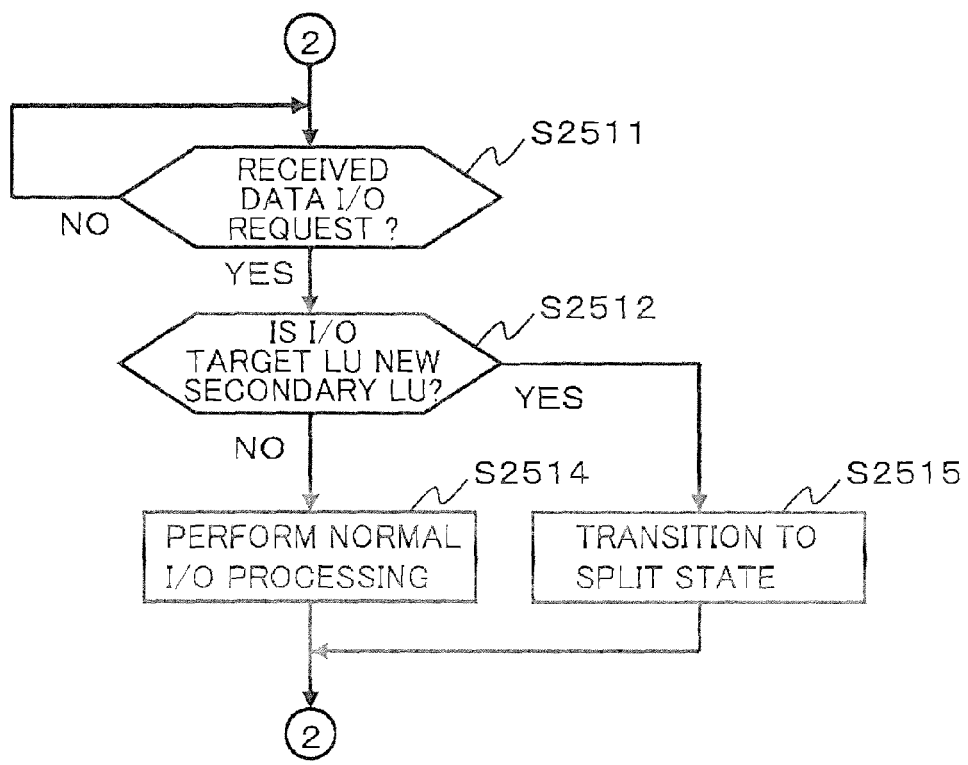
FIG. 25 is a flow chart for explaining data I/O processing (third storage apparatus) S2500.

FIG. 25 is a flowchart for explaining processing (hereinafter, referred to as data I/O processing (third storage apparatus) S2500) performed in the third storage apparatus 10 when the third storage apparatus 10 receives the data I/O request from the host computer 3 after the paths are set in the way described above.

Upon receiving the data I/O request sent from the host computer 3 (S2511: YES), the third storage apparatus 10 refers to the remote pair management table 640, and judges whether or not a LU (hereinafter, referred to as I/O target LU) being a target of the data I/O request is the new secondary LU (in other words, judges whether or not the LDEV 181 (hereinafter, referred to as I/O target LDEV) configuring the I/O target LU is registered in the remote pair management table 640) (S2512). If the I/O target LU is the new secondary LU (S2512: YES), processing proceeds to S2513, while if the I/O target LU is not the new secondary LU (S2512: NO), processing proceeds to S2514.

In S2515, the third storage apparatus 10 sets "Split (SSWS)" in the control state 646 of the LDEV 181 configuring the I/O target LU in the remote pair management table 640, and transitions the state of the remote pair including the I/O target LU to a split state. Note that, in this case, the transition to the split state is also notified to the second storage apparatus 10. In response to this notification, the second storage apparatus 10 sets "Split (PSUS)" in the control state 546 of a corresponding LDEV 181 in the remote pair management table 540 thereof. After that, the processing returns to S2511.

In S2514, normal I/O processing on the I/O target LU is performed. After that, the processing returns to S2511.

As described above, in the storage system 1 according to this embodiment, the first storage apparatus 10 and the second storage apparatus 10 each provide a common virtual serial number (virtual apparatus ID) as an identifier thereof to the host computer 3. Moreover, the first storage apparatus 10 and the second storage apparatus 10 each provide a common virtual LDEV number (virtual volume ID) as an identifier of the LDEV 181 (storage volume) therein to the host computer 3. Furthermore, a remote copy function is employed for the remote pairs respectively including the old primary LU and the new primary LU.

Furthermore, when an error occurs in the first storage apparatus 10, the second storage apparatus 10 starts to receive an data I/O request from the host computer 3 via the second path, and uses the local copy function for the local pair of the old secondary LU (second storage volume) and the new primary LU (third storage volume). Moreover, the second storage apparatus 10 and the third storage apparatus 10 start operation of the remote copy function for the remote pair of the new primary LU (third storage volume) and the new secondary LU (fourth storage volume). Then, the third storage apparatus 10 starts to receive the data I/O request from the host computer 3 via the fourth path, and starts data I/O to and from the fourth storage volume.

Here, at any of the stages described above, all of the storage apparatuses 10 provide a common virtual serial number and a common virtual LDEV number to the host computer 3. As described above, the storage system 1 according to the present embodiment performs processing to recover the storage system to a high-availability operational status by using the local copy function and the remote copy function provided in the storage apparatus 10, and at the same time always provides the host computer 3 with the common virtual serial number and the common virtual LDEV number in the time before and after the occurrence of an error and from the time after the occurrence of the error to the time when the storage system recovers to the high-availability operational status. Accordingly, the storage system 1 can continuously provide service during a period after the occurrence of the error in the first storage apparatus 10 until the storage system 1 recovers to a high-availability operational status, without causing the host computer 3 to change settings for the serial number and the LDEV.

Therefore, according to the storage system 1 of the present embodiment, even when an error occurs in the first storage apparatus 10, the storage system 1 can smoothly recover to a high-availability operational status without affecting the host computer 3.

Furthermore, during the recovering period described above, both the data I/O request to the old secondary LU via the second path and the data I/O request to the new primary LU via the third path can be received because the old secondary LU (second storage volume) and the new primary LU (third storage volume) are managed by the local copy function to make the data therein equal to each other. Accordingly, the reception of the data I/O request to the new primary LU via the third path can be smoothly started while the reception of the data I/O request to the old secondary LU via the second path is continuously performed.

Furthermore, the second storage apparatus 10, monitors whether or not the new primary LU is updated by the data I/O request after starting the reception of the data I/O request from the host computer 3 via the third path. When detecting that the new primary LU has been updated, the second storage apparatus 10 stops receiving the data I/O request from the host computer 3 via the second path. Accordingly, a path from the second path to the third path or the fourth path can be smoothly switched using the update of the new primary LU as a trigger, while the reception of the data I/O request to the old secondary LU with non-latest data is stopped.

Furthermore, as shown in the path management table 300 in each of FIG. 3 and FIG. 23, in the first stage before the error occurs in the first storage apparatus 10, the first storage apparatus 10 provides to the host computer 3, as a first virtual port ID, a virtual port ID (third virtual port ID) to be used as the third path, and provides to the host computer 3, as a second virtual port ID, a virtual port ID (fourth virtual port ID) to be used as the fourth path. Accordingly, in a failover (switching from the first path to the second path) from the first storage apparatus 10 to the second storage apparatus 10 or in switching from the second path to the third path or the fourth path, the host computer 3 does not have to change settings for a new path or be rebooted. Thus, the path can be switched without affecting the service of the host computer 3.

Although an embodiment has been described above, the embodiment is provided to facilitate the understanding of the present invention, and is not intended to limit the present invention. The present invention may be modified or improved without departing from the spirit of the present invention, and includes equivalents thereof.

The invention claimed is:

1. A storage system comprising:
a first storage apparatus communicatively coupled to a host computer and capable of providing a first storage volume;
a second storage apparatus communicatively coupled to the host computer and the first storage apparatus and capable of providing a second storage volume and a third storage volume; and
a third storage apparatus communicatively coupled to the host computer and the second storage apparatus and capable of providing a fourth storage volume, wherein
the first storage apparatus provides the host computer with a first virtual apparatus ID set for the first storage apparatus, a first virtual volume ID set for the first storage volume, and a first virtual port ID set for a network port in the first storage apparatus, as information for identifying a first path the host computer uses when sending a first data I/O request to the first storage volume,
the second storage apparatus provides the host computer with a second virtual apparatus ID set for the second storage apparatus, a second virtual volume ID set for the second storage volume, and a second virtual port ID set for a network port in the second storage apparatus, as information for identifying a second path the host computer uses when sending a second data I/O request to the second storage volume,
the second storage apparatus provides the host computer with the second virtual apparatus ID set for the second storage apparatus, a third virtual volume ID set for the third storage volume, and a third virtual port ID set for a network port in the second storage apparatus, as information for identifying a third path the host computer uses when sending a third data I/O request to the third storage volume,
the third storage apparatus provides the host computer with a third virtual apparatus ID set for the third storage apparatus, a fourth virtual volume ID set for the fourth storage volume, and a fourth virtual port ID set for a network port in the third storage apparatus, as information for identifying a fourth path the host computer uses when sending a fourth data I/O request to the fourth storage volume,
the first storage apparatus, the second storage apparatus, and the third storage apparatus provide the host computer with a common virtual apparatus ID as the first virtual apparatus ID, the second virtual apparatus ID, and the third virtual apparatus ID,
the first storage apparatus, the second storage apparatus, and the third storage apparatus provide the host computer with a common virtual volume ID as the first virtual volume ID, the second virtual volume ID, the third virtual volume ID, and the fourth virtual volume ID, when the first storage apparatus is normally operating, the first storage apparatus receives the first data I/O request from the host computer via the first path to perform data I/O to and from the first storage volume and performs management using a remote copy function for a pair of the first storage volume and the second storage volume, and when an error occurs in the first storage apparatus:
the second storage apparatus is configured to start to receive the second data I/O request from the host computer via the second path, and to start to perform data I/O to and from the second storage volume,
the second storage apparatus is configured to start management using a local copy function for a pair of the second storage volume and the third storage volume;
the second storage apparatus and the third storage apparatus are configured to start management using a remote copy function for a pair of the third storage volume and the fourth storage volume;
the second storage apparatus is configured to start to receive the third data I/O request from the host computer via the third path and to start to perform data I/O to and from the third storage volume; and
the third storage apparatus is configured to start to receive the fourth data I/O request from the host computer via the fourth path and to start to perform data I/O to and from the fourth storage volume.

2. The storage system according to claim 1, wherein the second storage apparatus is configured to start to receive the third data I/O request to the third storage volume from the host computer via the third path, while continuing to receive the second data I/O request to the second storage volume from the host computer via the second path.

3. The storage system according to claim 2, wherein the second storage apparatus is configured to monitor whether or not the third storage volume is updated by the third data I/O request after the reception of the third data I/O request from the host computer via the third path is started, and stops receiving the second data I/O request from the host computer via the second path when detecting an update of the third storage volume.

4. The storage system according to claim 1, wherein, before the error occurs in the first storage apparatus,
the first storage apparatus is configured to:
provide the host computer in advance with, as the first virtual port ID, a virtual port ID to be used as the third virtual port ID and
provide the host computer in advance with, as the second virtual port ID, a virtual port ID to be used as the fourth virtual port ID.

5. The storage system according to claim 1, wherein the third path is set as a path having a lower priority of use than the first path.

6. The storage system according to claim 1, wherein the local copy function is capable of transitioning a state of the pair of the second storage volume and the third storage volume to any one of: a pair state where data in both of the storage volumes are the same; a split state where data in the storage volumes are not the same, and information indicating locations of data blocks whose data are not the same is managed as difference information; and a re-sync state where the data in both of the storage volumes are made equal to each other on the basis of the difference information.

7. The storage system according to claim 1, wherein the remote copy function is capable of transitioning a state of the pair of the first storage volume and the second storage volume or a state of the pair of the third storage volume and the fourth storage volume to any one of: a pair state where data in the storage volumes are the same; a split state where data in the storage volumes are not the same, and information indicating locations of data blocks containing data that is not the same is managed as difference information; and a re-sync state where the data in both of the storage volumes are made equal to each other on the basis of the difference information.

8. A management method of a storage system, the storage system including:
a first storage apparatus communicatively coupled to a host computer and capable of providing a first storage volume,
a second storage apparatus communicatively coupled to the host computer and the first storage apparatus and capable of providing a second storage volume and a third storage volume, and
a third storage apparatus communicatively coupled to the host computer and the second storage apparatus and capable of providing a fourth storage volume, the method comprising:
the first storage apparatus providing the host computer with a first virtual apparatus ID set for the first storage apparatus, a first virtual volume ID set for the first storage volume, and a first virtual port ID set for a network port in the first storage apparatus, as information for identifying a first path the host computer uses when sending a first data I/O request to the first storage volume,
the second storage apparatus providing the host computer with a second virtual apparatus ID set for the second storage apparatus, a second virtual volume ID set for the second storage volume, and a second virtual port ID set for a network port in the second storage apparatus, as information for identifying a second path the host computer uses when sending a second data I/O request to the second storage volume,
the second storage apparatus providing the host computer with the second virtual apparatus ID set for the second storage apparatus, a third virtual volume ID set for the third storage volume, and a third virtual port ID set for a network port in the second storage apparatus, as information for identifying a third path the host computer uses when sending a third data I/O request to the third storage volume,
the third storage apparatus providing the host computer with a third virtual apparatus ID set for the third storage apparatus, a fourth virtual volume ID set for the fourth storage volume, and a fourth virtual port ID set for a network port in the third storage apparatus, as information for identifying a fourth path the host computer uses when sending a fourth data I/O request to the fourth storage volume,
the first storage apparatus, the second storage apparatus, and the third storage apparatus providing the host computer with a common virtual apparatus ID as the first virtual apparatus ID, the second virtual apparatus ID, and the third virtual apparatus ID,
the first storage apparatus, the second storage apparatus, and the third storage apparatus providing the host computer with a common virtual volume ID as the first virtual volume ID, the second virtual volume ID, the third virtual volume ID, and the fourth virtual volume ID, the first storage apparatus performing data I/O to and from the first storage volume by receiving the first data I/O request from the host computer via the first path and performing management using a remote copy function for a pair of the first storage volume and the second storage volume, when the first storage apparatus is normally operating, and when an error occurs in the first storage apparatus:
- the second storage apparatus starts receiving the second data I/O request from the host computer via the second path, and starts performing data I/O to and from the second storage volume,
- the second storage apparatus starting management using a local copy function for a pair of the second storage volume and the third storage volume;
- the second storage apparatus and the third storage apparatus starting management using the remote copy function for a pair of the third storage volume and the fourth storage volume;
- the second storage apparatus starts receiving the third data I/O request from the host computer via the third path and starts performing data I/O to and from the third storage volume; and
- the third storage apparatus starts receiving the fourth data I/O request from the host computer via the fourth path and starts performing data I/O to and from the fourth storage volume.

9. The management method of the storage system according to claim 8, wherein the second storage apparatus starts receiving the third data I/O request to the third storage volume from the host computer via the third path, while continuing to receive the second data I/O request to the second storage volume from the host computer via the second path.

10. The management method of the storage system according to claim 9, wherein the second storage apparatus monitoring whether or not the third storage volume is updated by the third data I/O request after the reception of the third data I/O request from the host computer via the third path is started, and stops receiving the second data I/O request from the host computer via the second path when detecting an update of the third storage volume.

11. The management method of the storage system according to claim 8, wherein, before the error occurs in the first storage apparatus,
the first storage apparatus
- providing the host computer in advance with, as the first virtual port ID, a virtual port ID to be used as the third virtual port ID, and
- providing the host computer in advance with, as the second virtual port ID, a virtual port ID to be used as the fourth virtual port ID.

12. The management method of the storage system according to claim 8, wherein the third path is set as a path having a lower priority of use than the first path.

13. The management method of the storage system according to claim 8, wherein the local copy function transitioning a state of the pair of the second storage volume and the third storage volume to any one of: a pair state where data in both of the storage volumes are the same; a split state where data in the storage volumes are not the same, and information indicating locations of data blocks whose data are not the same is managed as difference information; and a re-sync state where the data in both of the storage volumes are made equal to each other on the basis of the difference information.

14. The management method of the storage system according to claim 8, wherein the remote copy function transitioning a state of the pair of the first storage volume and the second storage volume or a state of the pair of the third storage volume and the fourth storage volume to any one of: a pair state where data of the storage volumes are the same; a split state where data in the storage volumes not the same, and information indicating locations of data blocks containing data that is not the same is managed as difference information; and a re-sync state where the data in both of the storage volumes are made equal to each other on the basis of the difference information.

* * * * *